US011590597B2

(12) United States Patent
Sigl et al.

(10) Patent No.: US 11,590,597 B2
(45) Date of Patent: Feb. 28, 2023

(54) SYSTEMS, METHODS, AND APPARATUS TO PREHEAT WELDING WIRE

(71) Applicant: Illinois Tool Works Inc., Glenview, IL (US)

(72) Inventors: Dennis Roland Sigl, Greenville, WI (US); Jake Zwayer, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 175 days.

(21) Appl. No.: 16/005,456

(22) Filed: Jun. 11, 2018

(65) Prior Publication Data

US 2018/0354057 A1 Dec. 13, 2018

Related U.S. Application Data

(60) Provisional application No. 62/517,537, filed on Jun. 9, 2017.

(51) Int. Cl.
*B23K 9/10* (2006.01)
*B23K 37/00* (2006.01)
*B23K 9/235* (2006.01)
*B23K 9/14* (2006.01)
*B23K 9/173* (2006.01)
(Continued)

(52) U.S. Cl.
CPC .......... *B23K 9/1093* (2013.01); *B23K 9/1043* (2013.01); *B23K 9/14* (2013.01); *B23K 9/173* (2013.01); *B23K 9/235* (2013.01); *B23K 9/26* (2013.01); *B23K 9/295* (2013.01); *B23K 37/003* (2013.01)

(58) Field of Classification Search
CPC .. B23K 9/1043; B23K 37/003; B23K 9/1093; B23K 9/14; B23K 9/235
See application file for complete search history.

(56) References Cited

U.S. PATENT DOCUMENTS

| 2,365,958 A | 12/1944 | Holslag |
| 2,416,047 A | 2/1947 | Dolan |
| 2,976,462 A | 3/1961 | Miller |

(Continued)

FOREIGN PATENT DOCUMENTS

| AT | 413801 | 6/2006 |
| CA | 2072711 | 12/1992 |

(Continued)

OTHER PUBLICATIONS

Int'l Search Report and Written Opinion for PCT/US2018/036914 dated Oct. 2, 2018 (14 pgs.).

(Continued)

*Primary Examiner* — Justin C Dodson
*Assistant Examiner* — Dilnessa B Belay
(74) *Attorney, Agent, or Firm* — McAndrews Held & Malloy, Ltd.

(57) ABSTRACT

Systems, methods, and apparatus to preheat welding wire are disclosed. An example welding assembly for a welding torch includes: a first contact tip configured to conduct welding current to a consumable electrode; a second contact tip configured to conduct preheating current to the consumable electrode; and a cooling body configured to transfer heat from at least the first contact tip to coolant and to conduct the welding current.

19 Claims, 22 Drawing Sheets

(51) Int. Cl.
  *B23K 9/26* (2006.01)
  *B23K 9/29* (2006.01)

(56) References Cited

U.S. PATENT DOCUMENTS

| | | |
|---|---|---|
| 3,030,495 A | 4/1962 | Anderson |
| 3,288,982 A | 11/1966 | Haruyoshi |
| 3,549,857 A | 12/1970 | Carter |
| 3,725,629 A | 4/1973 | Vickers |
| 3,809,853 A | 5/1974 | Manz |
| 3,849,871 A | 11/1974 | Kaunitz |
| 3,912,980 A | 10/1975 | Crump |
| 3,946,349 A | 3/1976 | Haldeman |
| 4,160,967 A | 7/1979 | Beech |
| 4,188,419 A | 2/1980 | Detert |
| 4,222,023 A | 9/1980 | Beech |
| 4,329,561 A | 5/1982 | Schafer |
| 4,426,565 A | 1/1984 | Rueter |
| 4,447,703 A | 5/1984 | Stol |
| 4,467,176 A | 8/1984 | Mizuno |
| 4,493,971 A | 1/1985 | Nawa |
| 4,531,040 A | 7/1985 | Nawa |
| 4,536,634 A | 8/1985 | Nawa |
| 4,546,234 A | 10/1985 | Ogasawara |
| 4,547,654 A | 10/1985 | Stol |
| 4,580,026 A | 4/1986 | Stol |
| 4,590,358 A | 5/1986 | Stol |
| 4,614,856 A | 9/1986 | Hori |
| 4,628,182 A | 12/1986 | Hori |
| 4,631,385 A | 12/1986 | Rothermel |
| 4,667,083 A | 5/1987 | Stol |
| 4,675,494 A | 6/1987 | Dilay |
| 4,728,761 A | 3/1988 | Mucha |
| 4,897,523 A | 1/1990 | Parks |
| 4,950,348 A | 8/1990 | Larsen |
| 4,954,691 A | 9/1990 | Parks |
| 4,973,821 A | 11/1990 | Martin |
| 5,043,557 A | 8/1991 | Tabata |
| 5,086,207 A | 2/1992 | Deam |
| 5,101,086 A | 3/1992 | Dion |
| 5,118,028 A | 6/1992 | Ogawa |
| 5,140,123 A | 8/1992 | Mitani |
| 5,148,001 A | 9/1992 | Stava |
| 5,208,433 A | 5/1993 | Hellegouarc |
| 5,270,516 A | 12/1993 | Hamamoto |
| 5,278,390 A | 1/1994 | Blankenship |
| 5,315,089 A | 5/1994 | Hughes |
| 5,319,179 A | 6/1994 | Joecks |
| 5,343,023 A | 8/1994 | Geissler |
| 5,349,156 A | 9/1994 | Madigan |
| 5,352,871 A | 10/1994 | Ross |
| 5,367,138 A | 11/1994 | Moss |
| 5,412,184 A | 5/1995 | McGaffigan |
| 5,461,215 A | 10/1995 | Haldeman |
| 5,466,916 A | 11/1995 | Iguchi |
| 5,504,309 A | 4/1996 | Geissler |
| 5,521,355 A | 5/1996 | Lorentzen |
| 5,526,561 A | 6/1996 | McGaffigan |
| 5,644,461 A | 7/1997 | Miller |
| 5,710,413 A | 1/1998 | King |
| 5,714,738 A | 2/1998 | Hauschulz |
| 5,739,506 A | 4/1998 | Hanton |
| 5,742,029 A | 4/1998 | Stava |
| 5,756,967 A | 5/1998 | Quinn et al. |
| 5,760,373 A | 6/1998 | Colling |
| 5,773,799 A | 6/1998 | Maxfield |
| 5,783,799 A | 7/1998 | Geissler |
| 5,832,765 A | 11/1998 | Ohashi |
| 5,844,193 A | 12/1998 | Nomura |
| 5,963,022 A | 10/1999 | Buda |
| 5,968,587 A | 10/1999 | Frankel |
| 5,994,659 A | 11/1999 | Offer |
| 6,002,104 A | 12/1999 | Hsu |
| 6,008,470 A | 12/1999 | Zhang |
| 6,043,471 A | 3/2000 | Wiseman |
| 6,051,810 A | 4/2000 | Stava |
| 6,077,369 A | 6/2000 | Kusano |
| 6,078,023 A | 6/2000 | Jones |
| 6,090,067 A | 7/2000 | Carter |
| 6,107,602 A | 8/2000 | Geissler |
| 6,115,273 A | 9/2000 | Geissler |
| 6,160,241 A | 12/2000 | Stava |
| 6,169,263 B1 | 1/2001 | Derby |
| 6,204,476 B1 | 3/2001 | Reynolds |
| 6,248,976 B1 | 6/2001 | Blankenship |
| 6,259,059 B1 | 7/2001 | Hsu |
| 6,265,688 B1 | 7/2001 | Lyshkow |
| 6,274,845 B1 | 8/2001 | Stava |
| 6,278,074 B1 | 8/2001 | Morlock |
| 6,292,715 B1 | 9/2001 | Rongo |
| 6,331,694 B1 | 12/2001 | Blankenship |
| 6,359,258 B1 | 3/2002 | Blankenship |
| 6,479,792 B1 | 11/2002 | Beiermann |
| 6,486,439 B1 | 11/2002 | Spear et al. |
| 6,515,259 B1 | 2/2003 | Hsu |
| 6,559,416 B1 | 5/2003 | Steenis |
| 6,583,386 B1 | 6/2003 | Ivkovich |
| 6,596,970 B2 | 7/2003 | Blankenship |
| 6,624,388 B1 | 9/2003 | Blankenship et al. |
| 6,642,482 B2 | 11/2003 | Rappl |
| 6,670,579 B2 | 12/2003 | Davidson et al. |
| 6,707,001 B1 | 3/2004 | Ulrich |
| 6,710,297 B1 | 3/2004 | Artelsmair |
| 6,720,529 B2 | 4/2004 | Davidson |
| 6,744,012 B2 | 6/2004 | Ueda |
| 6,747,247 B2 | 6/2004 | Holverson |
| 6,849,828 B2 | 2/2005 | Aigner |
| 6,906,284 B2 | 6/2005 | Kim |
| 6,909,067 B2 | 6/2005 | Davidson |
| 6,933,466 B2 | 8/2005 | Hutchison |
| 6,958,263 B2 | 10/2005 | Bhattacharyya |
| 6,974,931 B2 | 12/2005 | Holverson |
| 6,974,932 B2 | 12/2005 | Holverson |
| 6,995,338 B2 | 2/2006 | Hutchison |
| 7,002,103 B2 | 2/2006 | Holverson |
| 7,105,775 B2 | 9/2006 | Giese |
| 7,129,443 B2 | 10/2006 | Davidson |
| 7,145,101 B2 | 12/2006 | Tong |
| 7,244,905 B2 | 7/2007 | Das |
| 7,247,815 B2 | 7/2007 | Lajoie |
| 7,265,320 B2 | 9/2007 | Ou |
| 7,304,269 B2 | 12/2007 | Fulmer |
| 7,307,240 B2 | 12/2007 | Holverson |
| 7,351,933 B2 | 4/2008 | Huismann |
| 7,381,923 B2 | 6/2008 | Gordon |
| 7,576,300 B2 | 8/2009 | Giese |
| 7,626,139 B2 | 12/2009 | Matsuguchi |
| 7,663,074 B2 | 2/2010 | Wells |
| 7,683,290 B2 | 3/2010 | Daniel |
| 8,203,100 B2 | 6/2012 | Ueda |
| 8,288,686 B2 | 10/2012 | Kaufman |
| 8,304,692 B2 | 11/2012 | Ohkubo |
| 8,304,693 B2 | 11/2012 | Ma |
| 8,357,877 B2 | 1/2013 | Ma |
| 8,487,215 B2 | 7/2013 | Holverson |
| 8,604,388 B2 | 12/2013 | Dingeldein |
| 9,095,928 B2 | 8/2015 | Ash |
| 9,162,312 B2 | 10/2015 | Ma |
| 9,193,004 B2 | 11/2015 | Enyedy et al. |
| 9,193,005 B2 | 11/2015 | Ma |
| 9,227,262 B2 | 1/2016 | Wiryadinata |
| 9,233,432 B2 | 1/2016 | Zhang |
| 9,403,231 B2 | 8/2016 | Hutchison |
| 9,409,250 B2 | 8/2016 | Daniel |
| 9,463,523 B2 | 10/2016 | Roth |
| 9,539,662 B2 | 1/2017 | Hutchison |
| 9,669,486 B2 | 6/2017 | Dingeldein |
| 9,862,050 B2 | 1/2018 | Cole |
| 9,950,383 B2 | 4/2018 | Davidson |
| 10,232,458 B2 | 3/2019 | Grossauer |
| 2002/0008095 A1 | 1/2002 | Norrish |
| 2002/0045970 A1 | 4/2002 | Krause |
| 2002/0107825 A1 | 8/2002 | Manicke |
| 2002/0117487 A1 | 8/2002 | Corby |

(56) References Cited

U.S. PATENT DOCUMENTS

| | | | |
|---|---|---|---|
| 2002/0117488 A1 | 8/2002 | Arndt | |
| 2003/0010756 A1 | 1/2003 | Enyedy | |
| 2003/0058149 A1 | 3/2003 | Jayadeva | |
| 2004/0010342 A1 | 1/2004 | Thelen | |
| 2004/0069759 A1 | 4/2004 | Davidson | |
| 2004/0182828 A1 | 9/2004 | Schmidt | |
| 2004/0222204 A1 | 11/2004 | Hutchison | |
| 2004/0238511 A1 | 12/2004 | Matus | |
| 2005/0072762 A1* | 4/2005 | Delgado | B23K 9/285 219/75 |
| 2005/0082268 A1* | 4/2005 | Lajoie | B25B 13/48 219/136 |
| 2005/0184039 A1 | 8/2005 | Stava | |
| 2005/0218132 A1* | 10/2005 | Wells | B23K 9/291 219/137.61 |
| 2005/0269306 A1 | 12/2005 | Fulmer | |
| 2006/0138115 A1 | 6/2006 | Norrish | |
| 2006/0163227 A1 | 7/2006 | Hillen | |
| 2006/0163229 A1 | 7/2006 | Hutchison | |
| 2007/0051711 A1 | 3/2007 | Kachline | |
| 2007/0056945 A1 | 3/2007 | Hammen | |
| 2007/0084840 A1 | 4/2007 | Davidson | |
| 2007/0102407 A1 | 5/2007 | Uezono | |
| 2007/0170163 A1 | 7/2007 | Narayanan | |
| 2007/0235434 A1 | 10/2007 | Davidson | |
| 2007/0267394 A1 | 11/2007 | Beck | |
| 2008/0053978 A1 | 3/2008 | Peters | |
| 2008/0264916 A1 | 10/2008 | Nagano | |
| 2008/0264917 A1 | 10/2008 | White | |
| 2008/0264923 A1 | 10/2008 | White | |
| 2009/0026188 A1 | 1/2009 | Schorghuber | |
| 2009/0039066 A1 | 2/2009 | Centner | |
| 2009/0173726 A1 | 7/2009 | Davidson et al. | |
| 2009/0215302 A1 | 8/2009 | Roberts | |
| 2010/0012637 A1 | 1/2010 | Jaegar | |
| 2010/0059493 A1 | 3/2010 | McAninch | |
| 2010/0096373 A1 | 4/2010 | Hillen | |
| 2010/0096436 A1 | 4/2010 | Nangle | |
| 2010/0133250 A1 | 6/2010 | Sardy | |
| 2010/0176104 A1 | 7/2010 | Peters | |
| 2010/0308026 A1 | 12/2010 | Vogel | |
| 2010/0308027 A1 | 12/2010 | Vogel | |
| 2010/0314371 A1 | 12/2010 | Davidson | |
| 2011/0108527 A1 | 5/2011 | Peters | |
| 2011/0114612 A1 | 5/2011 | Holverson | |
| 2011/0163080 A1 | 7/2011 | Beck | |
| 2011/0204034 A1 | 8/2011 | Schartner | |
| 2011/0204035 A1* | 8/2011 | Grossauer | B23K 9/1336 219/137 R |
| 2011/0297658 A1 | 8/2011 | Peters | |
| 2011/0248007 A1 | 10/2011 | Takeda | |
| 2011/0266269 A1 | 11/2011 | Kachline | |
| 2012/0024828 A1 | 2/2012 | Oowaki | |
| 2012/0061362 A1 | 3/2012 | Davidson | |
| 2012/0074112 A1 | 3/2012 | Kotera | |
| 2012/0097655 A1 | 4/2012 | Daniel | |
| 2012/0248080 A1 | 10/2012 | Hutchison | |
| 2012/0285932 A1* | 11/2012 | Yuan | B23K 9/173 219/74 |
| 2012/0291172 A1 | 11/2012 | Wills | |
| 2012/0298642 A1 | 11/2012 | Lambert | |
| 2013/0112674 A1 | 5/2013 | Mnich | |
| 2013/0112676 A1 | 5/2013 | Hutchison | |
| 2013/0134143 A1* | 5/2013 | Hassan | B23K 9/26 219/138 |
| 2013/0213942 A1 | 8/2013 | Peters | |
| 2013/0264323 A1 | 10/2013 | Daniel | |
| 2013/0270245 A1 | 10/2013 | Holverson | |
| 2014/0008328 A1 | 1/2014 | Enyedy | |
| 2014/0008331 A1 | 1/2014 | Ogborn | |
| 2014/0008339 A1 | 1/2014 | Ogborn | |
| 2014/0008343 A1 | 1/2014 | Ash | |
| 2014/0008344 A1 | 1/2014 | Enyedy | |
| 2014/0008354 A1 | 1/2014 | Pletcher | |
| 2014/0021183 A1* | 1/2014 | Peters | B23K 9/173 219/130.51 |
| 2014/0021186 A1 | 1/2014 | Denney | |
| 2014/0021187 A1 | 1/2014 | Denney | |
| 2014/0021188 A1 | 1/2014 | Denney | |
| 2014/0034621 A1 | 2/2014 | Daniel | |
| 2014/0034622 A1 | 2/2014 | Barrett | |
| 2014/0035279 A1 | 2/2014 | Narayanan | |
| 2014/0042129 A1 | 2/2014 | Daniel | |
| 2014/0042138 A1 | 2/2014 | Matthews | |
| 2014/0048524 A1 | 2/2014 | Ash | |
| 2014/0116994 A1 | 5/2014 | Peters | |
| 2014/0131321 A1 | 5/2014 | Enyedy | |
| 2014/0158669 A1 | 6/2014 | Davidson | |
| 2014/0177109 A1 | 6/2014 | Curtis | |
| 2014/0183176 A1 | 7/2014 | Hutchison | |
| 2014/0217077 A1 | 8/2014 | Davidson | |
| 2014/0251971 A1 | 9/2014 | Hearn | |
| 2014/0263193 A1 | 9/2014 | Denney | |
| 2014/0263194 A1 | 9/2014 | Narayanan | |
| 2014/0263228 A1 | 9/2014 | Peters | |
| 2014/0263229 A1 | 9/2014 | Peters | |
| 2014/0263230 A1 | 9/2014 | Peters | |
| 2014/0263231 A1 | 9/2014 | Peters | |
| 2014/0263234 A1 | 9/2014 | Peters | |
| 2014/0263237 A1 | 9/2014 | Daniel | |
| 2014/0263241 A1 | 9/2014 | Henry | |
| 2014/0263243 A1 | 9/2014 | Marschke | |
| 2014/0263251 A1 | 9/2014 | Enyedy | |
| 2014/0319103 A1* | 10/2014 | Stabb | B23K 9/295 219/74 |
| 2014/0367370 A1 | 12/2014 | Hutchison | |
| 2014/0374391 A1 | 12/2014 | Cole | |
| 2015/0001184 A1 | 1/2015 | Cole | |
| 2015/0001197 A1 | 1/2015 | Marschke | |
| 2015/0014283 A1 | 1/2015 | Peters | |
| 2015/0028010 A1 | 1/2015 | Peters | |
| 2015/0028011 A1 | 1/2015 | Peters | |
| 2015/0028012 A1 | 1/2015 | Peters | |
| 2015/0083702 A1 | 3/2015 | Scott | |
| 2015/0090703 A1 | 4/2015 | Peters | |
| 2015/0105898 A1 | 4/2015 | Adams | |
| 2015/0151375 A1 | 6/2015 | Peters | |
| 2015/0158105 A1 | 6/2015 | Peters | |
| 2015/0158106 A1 | 6/2015 | Peters | |
| 2015/0158107 A1 | 6/2015 | Latessa | |
| 2015/0158108 A1 | 6/2015 | Peters | |
| 2015/0183044 A1 | 7/2015 | Peters | |
| 2015/0183045 A1 | 7/2015 | Peters | |
| 2015/0209889 A1 | 7/2015 | Peters | |
| 2015/0209905 A1 | 7/2015 | Matthews | |
| 2015/0209906 A1 | 7/2015 | Denney et al. | |
| 2015/0209907 A1 | 7/2015 | Narayanan | |
| 2015/0209908 A1 | 7/2015 | Peters | |
| 2015/0209910 A1 | 7/2015 | Denney | |
| 2015/0209913 A1 | 7/2015 | Denney | |
| 2015/0213921 A1 | 7/2015 | Koide | |
| 2015/0251275 A1 | 9/2015 | Denney et al. | |
| 2015/0273612 A1 | 10/2015 | Peters | |
| 2015/0283638 A1 | 10/2015 | Henry | |
| 2015/0283639 A1 | 10/2015 | Henry | |
| 2016/0074954 A1 | 3/2016 | Marschke | |
| 2016/0074973 A1* | 3/2016 | Kachline | B23K 9/173 219/74 |
| 2016/0144444 A1 | 5/2016 | Davidson | |
| 2016/0167151 A1 | 6/2016 | Mehn | |
| 2016/0175975 A1 | 6/2016 | Lattner | |
| 2016/0199939 A1 | 7/2016 | Hartman | |
| 2016/0221105 A1 | 8/2016 | Henry | |
| 2016/0288235 A1 | 10/2016 | Davidson | |
| 2016/0318112 A1 | 11/2016 | Hutchison | |
| 2017/0080512 A1 | 3/2017 | Centner | |
| 2017/0165778 A1 | 6/2017 | Hsu | |
| 2017/0225255 A1 | 8/2017 | Zwayer | |
| 2018/0236585 A1 | 8/2018 | Davidson | |
| 2018/0333798 A1 | 11/2018 | Uecker | |
| 2018/0354052 A1 | 12/2018 | Schartner | |

(56) References Cited

U.S. PATENT DOCUMENTS

| | | | |
|---|---|---|---|
| 2018/0354057 A1 | 12/2018 | Sigl | |
| 2018/0354075 A1 | 12/2018 | Liu | |

FOREIGN PATENT DOCUMENTS

| | | |
|---|---|---|
| CA | 2242273 | 2/2000 |
| CA | 2883947 | 3/2014 |
| CN | 2125475 | 12/1992 |
| CN | 2181354 | 11/1994 |
| CN | 1298778 | 6/2001 |
| CN | 1496774 | 5/2004 |
| CN | 1600486 | 3/2005 |
| CN | 1640603 | 7/2005 |
| CN | 1712168 | 12/2005 |
| CN | 1714978 | 1/2006 |
| CN | 1836818 | 9/2006 |
| CN | 1871093 | 11/2006 |
| CN | 101062530 | 10/2007 |
| CN | 201098775 | 8/2008 |
| CN | 101376191 | 3/2009 |
| CN | 201249331 | 6/2009 |
| CN | 101804495 | 8/2010 |
| CN | 101862886 | 10/2010 |
| CN | 102059476 | 5/2011 |
| CN | 102470473 | 5/2012 |
| CN | 102554418 | 7/2012 |
| CN | 102596475 | 7/2012 |
| CN | 102770228 | 11/2012 |
| CN | 102825370 | 12/2012 |
| CN | 202824943 | 3/2013 |
| CN | 104968465 | 10/2015 |
| DE | 2501928 | 7/1976 |
| DE | 19808383 | 9/1999 |
| DE | 212004000048 | 6/2006 |
| EP | 0150543 | 8/1985 |
| EP | 0194045 | 9/1986 |
| EP | 0204559 | 12/1986 |
| EP | 0387223 | 9/1990 |
| EP | 0936019 A2 | 8/1999 |
| EP | 0936019 A3 | 3/2001 |
| EP | 1232825 | 8/2002 |
| EP | 2218537 | 8/2010 |
| EP | 2286949 | 2/2011 |
| EP | 2322315 | 5/2011 |
| EP | 2522453 | 11/2012 |
| EP | 2892680 | 7/2015 |
| EP | 2781291 | 10/2015 |
| FR | 1443701 | 6/1966 |
| JP | S5719166 | 2/1982 |
| JP | S57109573 | 7/1982 |
| JP | S583784 | 1/1983 |
| JP | S58119466 | 7/1983 |
| JP | S60108175 | 6/1985 |
| JP | S60108176 | 6/1985 |
| JP | S60170577 | 9/1985 |
| JP | 61186172 | 8/1986 |
| JP | S629773 | 1/1987 |
| JP | S6471575 | 3/1989 |
| JP | H03285768 | 12/1991 |
| JP | H06277840 | 10/1994 |
| JP | H07204848 | 8/1995 |
| JP | H1097327 | 4/1998 |
| JP | H11156542 | 6/1999 |
| JP | 2001276971 | 10/2001 |
| JP | 2003205385 | 7/2003 |
| JP | 2003311409 | 11/2003 |
| JP | 2005034853 | 2/2005 |
| JP | 2006205189 | 8/2006 |
| JP | 2009072814 | 4/2009 |
| JP | 4950819 | 6/2012 |
| JP | 2014176890 | 9/2014 |
| KR | 1020060133016 | 12/2006 |
| KR | 20080009816 | 1/2008 |
| KR | 20100120562 | 11/2010 |
| KR | 1020120027764 | 3/2012 |
| KR | 101497460 | 3/2015 |
| SU | 872102 | 10/1981 |
| WO | 9640465 | 12/1996 |
| WO | 9965635 | 12/1999 |
| WO | 0132347 | 5/2001 |
| WO | 0153030 | 7/2001 |
| WO | 2005030422 | 4/2005 |
| WO | 2014140783 | 9/2014 |
| WO | 2015125008 | 8/2015 |

OTHER PUBLICATIONS

Int'l Search Report and Written Opinion for PCT/US2016/065265 dated Mar. 14, 2017 (16 pages).
International Search Report from PCT Application No. PCT/US2014/055529, dated Mar. 6, 2015, 9 pgs.
International Search Report from PCT application No. PCT/US2013/073863 dated May 2, 2014, 15 pgs.
International Search Report from PCT application No. PCT/US2014/014241 dated May 9, 2014, 8 pgs.
PCT International Search Report & Written Opinion of PCT/US2012/063783 dated Mar. 1, 2013, 12 pages.
International Search Report from PCT application No. PCT/US2013/077710 dated May 9, 2014, 12 pgs.
International Search Report from PCT application No. PCT/US2013/073490 dated May 13, 2014, 10 pgs.
International Search Report from PCT application No. PCT/US2014/017864, dated Aug. 22, 2014, 9 pgs.
International Search Report from PCT application No. PCT/US2014/045872, dated Nov. 4, 2014, 10 pgs.
International Search Report from PCT application No. PCT/US2014/041201, dated Nov. 4, 2014, 11 pg.
International Search Report from PCT application No. PCT/US2015/045715, dated Jan. 7, 2016, 12 pgs.
International Search Report from PCT application No. PCT/US2015/055040, dated Feb. 3, 2016, 11 pgs.
International Search Report from PCT application No. PCT/US2015/056121, dated Apr. 4, 2016, 11 pgs.
International Search Report from PCT application No. PCT/US2016/017385, dated Jul. 19, 2016, 13 pgs.
Bondy et al., "Graph Theory with Applications," Department of Combinatorics and Optimization, University of Waterloo, 1976, p. 7-8.
"ALT 304," Miller—The Power of Blue, Jun. 2001.
"Maxstar 200 SD, DX, and LX," Miller Electric Mfg. Co., Oct. 2003.
Office Action from U.S. Appl. No. 15/498,249 dated Apr. 20, 2018.
Int'l Search Report and Written Opinion for PCT/US2018/029770 dated Sep. 12, 2018 (13 pgs.).
Int'l Search Report and Written Opinion for PCT/US2018/036915 dated Oct. 1, 2018 (15 pgs).
Int'l Search Report and Written Opinion for PCT/US2018/036906 dated Oct. 1, 2018 (15 pgs.).
Int'l Search Report and Written Opinion for PCT/US2018/036919 dated Oct. 2, 2018 (13 pgs.).
Int'l Search Report and Written Opinion for PCT/US2018/036852 dated Oct. 2, 2018 (17 pgs).
Int'l Search Report and Written Opinion for PCT/US2018/035087 dated Sep. 19, 2018 (15 pgs.).
N.A.: "Drahtgluhe", Aug. 23, 2016 (Aug. 23, 2016), XP055510057, Wikipedia, Retrieved from the Internet: URL:https://de.wikipedia.Org/w/index.php7title=Drahtgl%C3%BChe&oldid=157333005, [retrieved on Sep. 26, 2018], with machine translation, 2 pages.
Int'l Search Report and Written Opinion for PCT/US2018/036898 dated Oct. 1, 2018 (14 pgs.).
Int'l Search Report and Written Opinion for PCT/US2018/036900 dated Oct. 5, 2018 (15 pgs.).
Int'l Search Report and Written Opinion for PCT/US2018/049888 dated Feb. 1, 2019 (14 pgs.).
Int'l Search Report and Written Opinion for PCT/US2018/052384 dated Feb. 12, 2019 (12 pgs.).
Non-Final Office Action U.S. Appl. No. 15/343,992 dated Mar. 7, 2019 (18 pgs.).

(56) References Cited

OTHER PUBLICATIONS

Canadian Office Action Appln No. 3,005,408 dated Mar. 19, 2019.
Pitrun, "The effect of welding parameters on levels of diffusible hydrogen in weld metal deposited using gas shield rutile flux cored wires," Published in 2004.
Gupta, "A low temperature hydrogen sensor based on palladium nanoparticles," Published in 2014.
Lincoln Electric, "Storing and Redrying Electrodes," Published in 2011.
Non-Final Office Action U.S. Appl. No. 15/498,249 dated Sep. 23, 2019 (43 pgs).
Int'l Search Report and Written Opinion Appln No. PCT/US2019/050972, dated Nov. 14, 2019, (13 pgs).
Int'l Search Report and Written Opinion Appln No. PCT/U2019/049109 dated Dec. 2, 2019 (11 pgs).
PCT, IPRP, issued in connection with PCT/US2018/036898, dated Dec. 19, 2019, 7 pages.
PCT, IPRP, issued in connection with PCT/US2018/036900, dated Dec. 19, 2019, 7 pages.
Int'l Search Report and Written Opinion Appln No. PCT/U2019/067491 dated Jun. 25, 2020.
European Office Action Appln No. 20164462.2 dated Sep. 7, 2020.
European Office Action Appln No. 18735144.0 dated Dec. 18, 2020.
European Office Action Appln No. 18735144.0 dated Dec. 21, 2020.
Canadian Office Action Appln. No. 3,066,677 dated Mar. 16, 2021.

\* cited by examiner

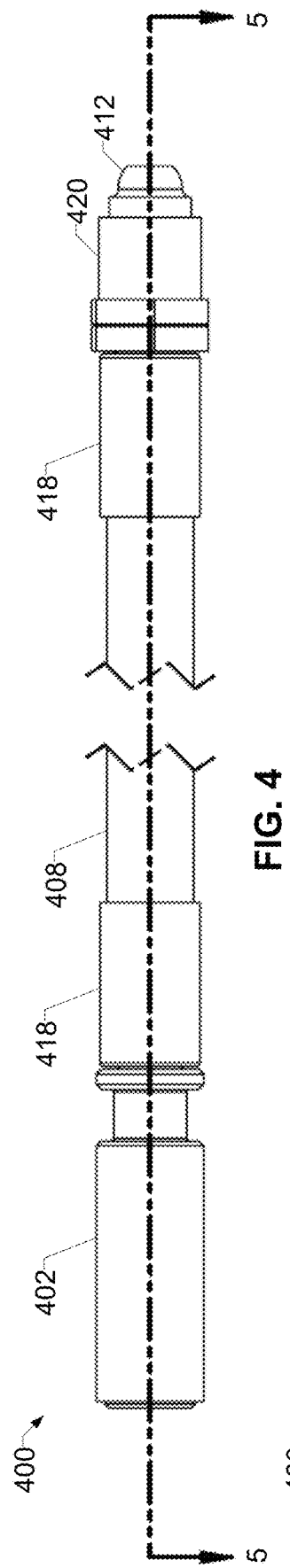
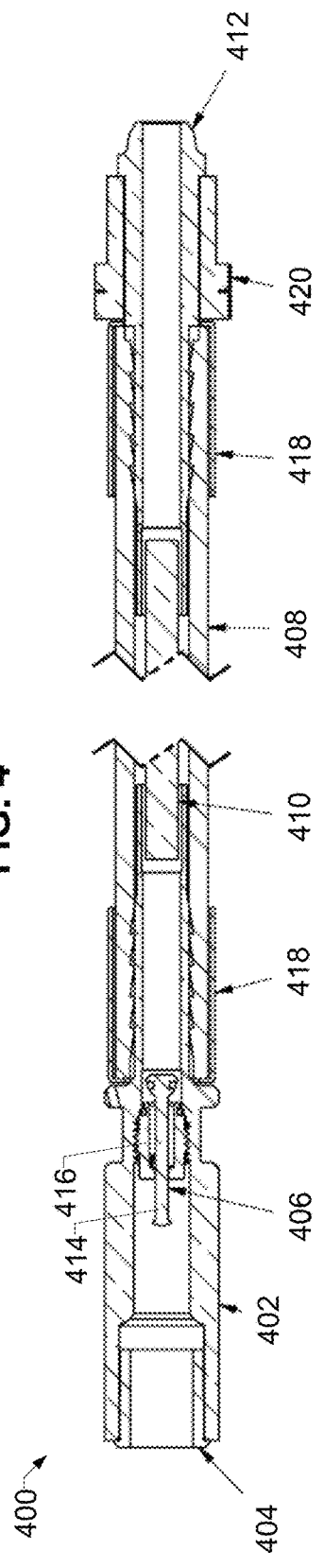
FIG. 4
FIG. 5

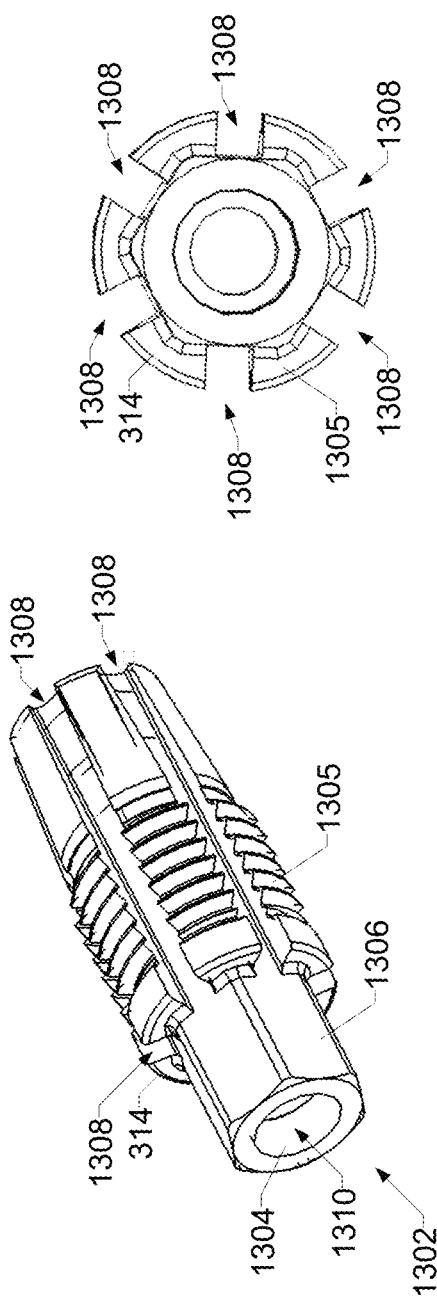
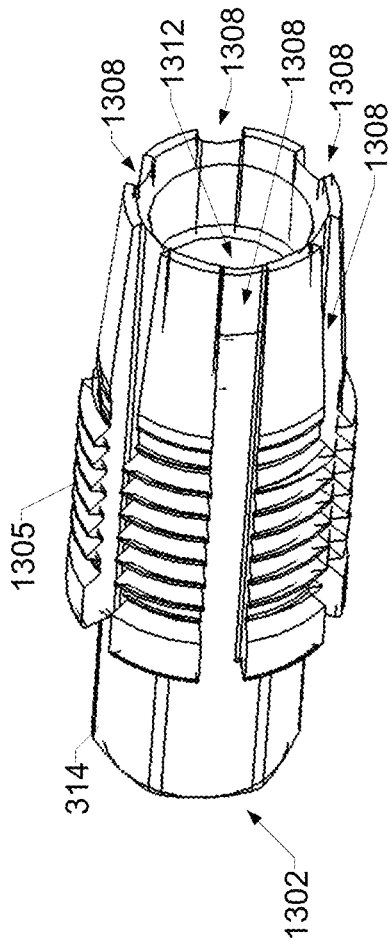
FIG. 13A
FIG. 13B
FIG. 13C

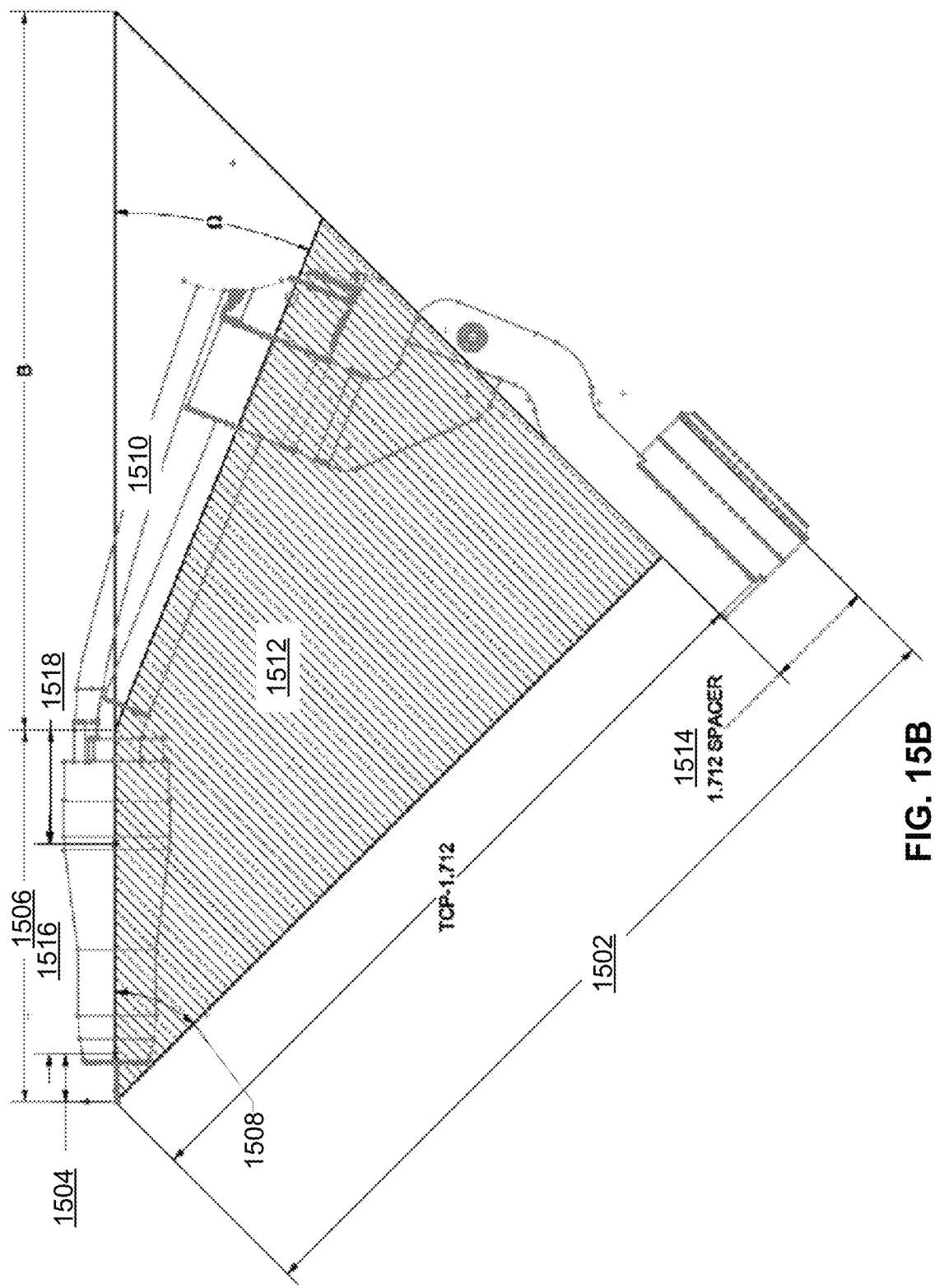

SYSTEMS, METHODS, AND APPARATUS TO PREHEAT WELDING WIRE

RELATED APPLICATIONS

This patent claims priority to U.S. Provisional Patent Application Ser. No. 62/517,537, filed Jun. 9, 2017, entitled "Systems, Methods, and Apparatus to Preheat Welding Wire." The entirety of U.S. Provisional Patent Application Ser. No. 62/517,537 is incorporated herein by reference.

BACKGROUND

This disclosure relates generally to welding and, more particularly, to welding torches and methods to provide wire preheating for welding.

Welding is a process that has increasingly become ubiquitous in all industries. Welding is, at its core, simply a way of bonding two pieces of metal. A wide range of welding systems and welding control regimes have been implemented for various purposes. In continuous welding operations, metal inert gas (MIG) welding and submerged arc welding (SAW) techniques allow for formation of a continuing weld bead by feeding welding wire shielded by inert gas from a welding torch and/or by flux. Such wire feeding systems are available for other welding systems, such as tungsten inert gas (TIG) welding. Electrical power is applied to the welding wire and a circuit is completed through the workpiece to sustain a welding arc that melts the electrode wire and the workpiece to form the desired weld.

While very effective in many applications, these welding techniques may experience different initial welding performance based upon whether the weld is started with the electrode "cold" or "hot." In general, a cold electrode start may be considered a start in which the electrode tip and adjacent metals are at or relatively near the ambient temperature. Hot electrode starts, by contrast, are typically those in which the electrode tip and the adjacent metals' temperature are much more elevated, but below the melting point of the electrode wire. In some applications, it is believed that initiation of welding arcs and welds is facilitated when the electrode is hot. However, the current state of the art does not provide regimes designed to ensure that the electrode is heated prior to initiation of a welding operation.

BRIEF DESCRIPTION OF THE DRAWINGS

FIG. 4 is a more detailed depiction of an example liquid cooling assembly that may be used to implement the liquid cooling assemblies of FIG. 2.

FIG. 5 is a cross-section view of the liquid-cooled power cable assembly of FIG. 4.

FIGS. 13A, 13B, and 13C show an example implementation of the second contact tip of FIG. 10.

FIG. 15B illustrates an example implementation of the liquid-cooled welding torch of FIG. 2 configured to replace the conventional torch of FIG. 15A while maintaining a same tool center point distance and torch neck angle.

The figures are not to scale. Where appropriate, the same or similar reference numerals are used in the figures to refer to similar or identical elements.

DETAILED DESCRIPTION

Figure 1:
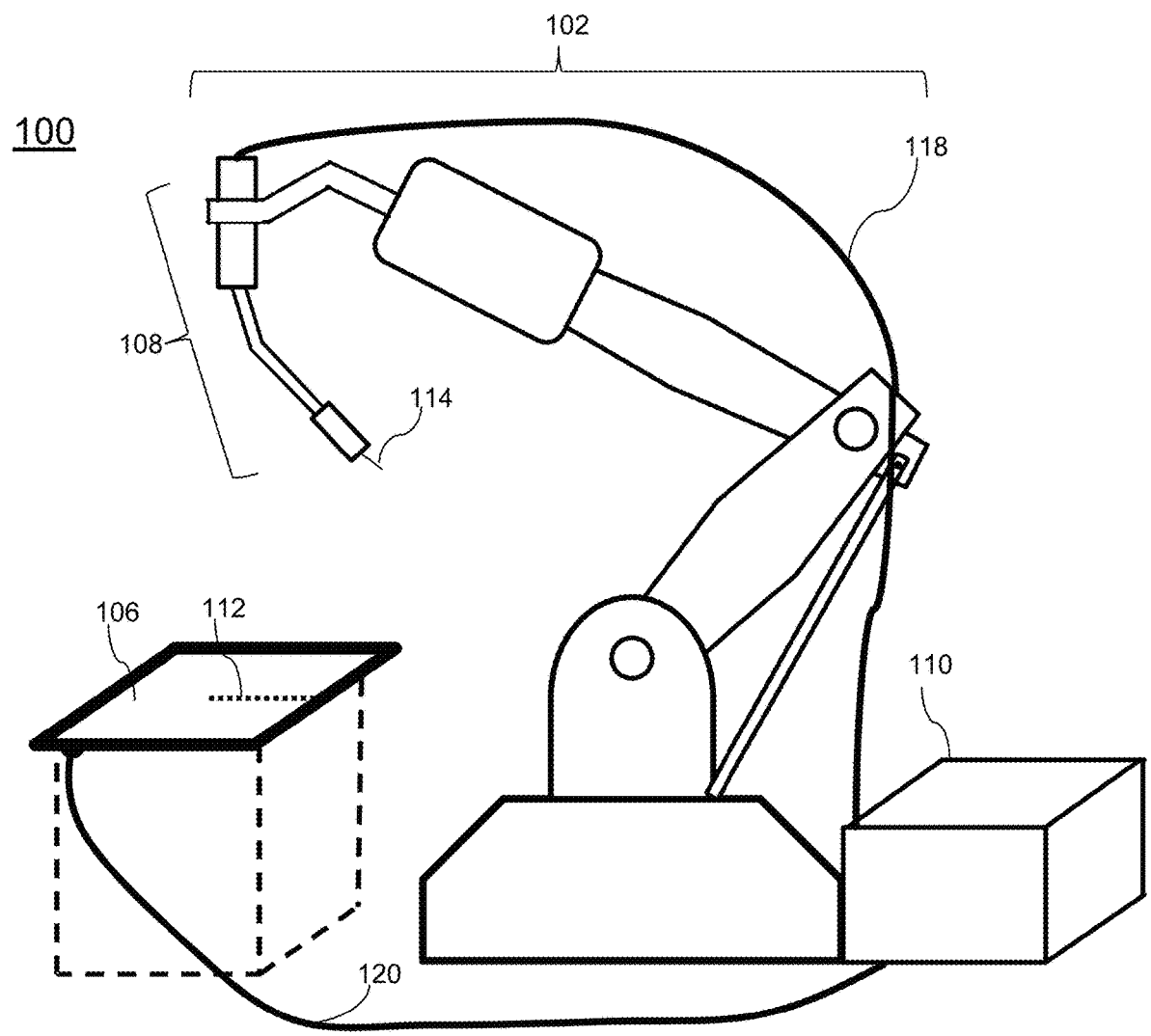
FIG. 1 illustrates an example robotic welding system in which a robot is used to weld a workpiece using a welding tool, in accordance with aspects of this disclosure.

For the purpose of promoting an understanding of the principles of this disclosure, reference will be now made to the examples illustrated in the drawings and specific language will be used to describe the same. It will nevertheless be understood that no limitation of the scope of the claims is intended by this disclosure. Modifications in the illustrated examples and such further applications of the principles of this disclosure as illustrated therein are contemplated as would typically occur to one skilled in the art to which this disclosure relates.

As used herein, the word "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

As utilized herein the terms "circuits" and "circuitry" refer to physical electronic components (i.e. hardware) and any software and/or firmware (code) that may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y, and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

As used herein, a wire-fed welding-type system refers to a system capable of performing welding (e.g., gas metal arc welding (GMAW), gas tungsten arc welding (GTAW), etc.), brazing, cladding, hardfacing, and/or other processes, in which a filler metal is provided by a wire that is fed to a work location, such as an arc or weld puddle.

As used herein, a welding-type power source refers to any device capable of, when power is applied thereto, supplying welding, cladding, plasma cutting, induction heating, laser (including laser welding and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

As used herein, preheating refers to heating the electrode wire prior to a welding arc and/or deposition in the travel path of the electrode wire.

As used herein, the terms "front" and/or "forward" refer to locations closer to a welding arc, while "rear," "back," "behind," and/or "backward" refers to locations farther from a welding arc.

Some disclosed examples describe electric currents being conducted "from" and/or "to" locations in circuits and/or power supplies. Similarly, some disclosed examples describe "providing" electric current via one or more paths, which may include one or more conductive or partially conductive elements. The terms "from," "to," and "providing," as used to describe conduction of electric current, do not necessitate the direction or polarity of the current. Instead, these electric currents may be conducted in either direction or have either polarity for a given circuit, even if an example current polarity or direction is provided or illustrated.

Disclosed example welding assemblies for welding torches include: a first contact tip configured to conduct welding current to a consumable electrode; second contact tip configured to conduct preheating current to the consumable electrode; and a cooling body configured to transfer heat from at least the first contact tip to coolant and to conduct the welding current.

Some example welding assemblies further include a contact tip insulator configured to insulate the second contact tip from the first contact tip, in which the contact tip insulator includes: an interior surface configured to be removably attached to a torch neck holding a contact tip; an exterior surface configured to contact the cooling body to prevent electrical contact between the cooling body and the second contact tip; and a seal on the exterior surface to substantially seal gas flow in cooperation with the cooling body. In some examples, the contact tip insulator comprises at least one of a ceramic or a plastic. In some examples, the contact tip insulator is a thermal insulator.

Some example welding assemblies further include a wire guide, the wire guide comprising a dielectric material and having an inner bore configured to permit passage of a consumable electrode wire from the second contact tip to the first contact tip. In some examples, the dielectric material comprises at least one of a ceramic, a liquid ceramic, silicon nitride, or a dielectric exterior coating. In some examples, the second contact tip includes: an inner bore configured to deliver current to a consumable welding electrode; and screw threads on an exterior of the second contact tip, in which the screw threads include longitudinal slots to permit welding gas to flow along an exterior of the contact tip.

In some examples, the second contact tip includes a hex head opposite the screw threads on an exterior of the preheating contact tip to enable attachment and detachment of the second contact tip via a tip of a welding assembly. Some example welding assemblies further include a diffuser including: a first exterior portion configured to be coupled to the cooling body; a first interior portion configured to receive welding gas from an interior of the cooling body; a second interior portion configured to receive the first contact tip and to conduct current to the first contact tip; and a gas diffusion port configured to conduct welding gas from the first interior portion to a second exterior portion, the gas diffusion port configured to conduct the welding gas in a radial direction of the diffuser. Some examples further include an insulator configured to electrically insulate the diffuser from a nozzle.

In some example welding assemblies, the cooling body includes a liquid coolant inlet port, a liquid coolant outlet port, and a channel to channel the liquid coolant from the liquid coolant inlet port to the liquid coolant outlet port. In some examples, the liquid coolant inlet port includes a valve actuator configured to actuate a valve by insertion into a first socket, and the liquid coolant outlet port includes a valve actuator configured to actuate a valve by insertion into a second socket. Some example welding assemblies further include an exterior nut configured to secure a first portion of the welding assembly to a second portion of the welding assembly, in which the first portion of the welding assembly includes the first contact tip. In some examples, the first portion of the welding assembly comprises at least one of the second contact tip or the cooling body. In some examples, the cooling body includes a conductive body having one or more channels between the liquid coolant inlet port and the liquid coolant outlet port, and a cover to enclose the one or more channels.

Referring to FIG. 1, an example welding system 100 is shown in which a robot 102 is used to weld a workpiece 106 using a welding tool 108, such as the illustrated bent-neck (i.e., gooseneck design) welding torch (or, when under manual control, a handheld torch), to which power is delivered by welding equipment 110 via conduit 118 and returned by way of a ground conduit 120. The welding equipment 110 may comprise, inter alia, one or more power sources (each generally referred to herein as a "power supply"), a source of a shield gas, a wire feeder, and other devices. Other devices may include, for example, water coolers, fume extraction devices, one or more controllers, sensors, user interfaces, communication devices (wired and/or wireless), etc.

The welding system 100 of FIG. 1 may form a weld (e.g., at weld joint 112) between two components in a weldment by any known electric welding techniques. Known electric welding techniques include, inter alia, shielded metal arc welding (SMAW), MIG, flux-cored arc welding (FCAW), TIG, laser welding, sub-arc welding (SAW), stud welding, friction stir welding, and resistance welding. MIG, TIG, hot wire cladding, hot wire TIG, hot wire brazing, multiple arc applications, and SAW welding techniques, inter alia, may involve automated or semi-automated external metal filler (e.g., via a wire feeder). In multiple arc applications (e.g., open arc or sub-arc), the preheater may pre-heat the wire into a pool with an arc between the wire and the pool. The welding equipment 110 may be arc welding equipment having one or more power supplies, and associated circuitry, that provides a direct current (DC), alternating current (AC), or a combination thereof to an electrode wire 114 of a welding tool (e.g., welding tool 108). The welding tool 108 may be, for example, a TIG torch, a MIG torch, or a flux cored torch (commonly called a MIG "gun"). The electrode wire 114 may be tubular-type electrode, a solid type wire, a flux-core wire, a seamless metal core wire, and/or any other type of electrode wire.

As will be discussed below, the welding tool 108 employs a contact tip assembly that heats the electrode wire 114 prior to forming a welding arc using the electrode wire 114. Suitable electrode wire 114 types includes, for example, tubular wire, metal cored wire, aluminum wire, solid gas metal arc welding (GMAW) wire, composite GMAW wire, gas-shielded FCAW wire, SAW wire, self-shielded wire, etc.

In the welding system 100, the robot 102, which is operatively coupled to welding equipment 110 via conduit 118 and ground conduit 120, controls the location of the welding tool 108 and operation of the electrode wire 114 (e.g., via a wire feeder) by manipulating the welding tool 108 and triggering the starting and stopping of the current flow (whether a preheat current and/or welding current) to the electrode wire 114 by sending, for example, a trigger signal to the welding equipment 110. When welding current is flowing, a welding arc is developed between the electrode wire 114 and the workpiece 106, which ultimately produces a weldment. The conduit 118 and the electrode wire 114 thus deliver welding current and voltage sufficient to create the electric welding arc between the electrode wire 114 and the workpiece 106. At the point of welding between the electrode wire 114 and the workpiece 106, the welding arc locally melts the workpiece 106 and electrode wire 114 supplied to the weld joint 112, thereby forming a weld joint 112 when the metal cools.

In certain aspects, in lieu of a robot 102's robotic arm, a human operator may control the location and operation of the electrode wire 114. For example, an operator wearing welding headwear and welding a workpiece 106 using a handheld torch to which power is delivered by welding equipment 110 via conduit 118. In operation, as with the system 100 of FIG. 1, an electrode wire 114 delivers the current to the point of welding on the workpiece 106 (e.g., a weldment). The operator, however, could control the location and operation of the electrode wire 114 by manipulating the handheld torch and triggering the starting and stopping of the current flow via, for example, a trigger. A handheld torch generally comprises a handle, a trigger, a conductor tube, a nozzle at the distal end of the conductor tube, and a contact tip assembly. Applying pressure to the trigger (i.e., actuating the trigger) initiates the welding process by sending a trigger signal to the welding equipment 110, whereby welding current is provided, and the wire feeder is activated as needed (e.g., to drive the electrode wire 114 forward to feed the electrode wire 114 and in reverse to retract the electrode wire 114). Commonly owned U.S. Pat. No. 6,858,818 to Craig S. Knoener, for example, describes an example system and method of controlling a wire feeder of a welding-type system.

Figure 2:
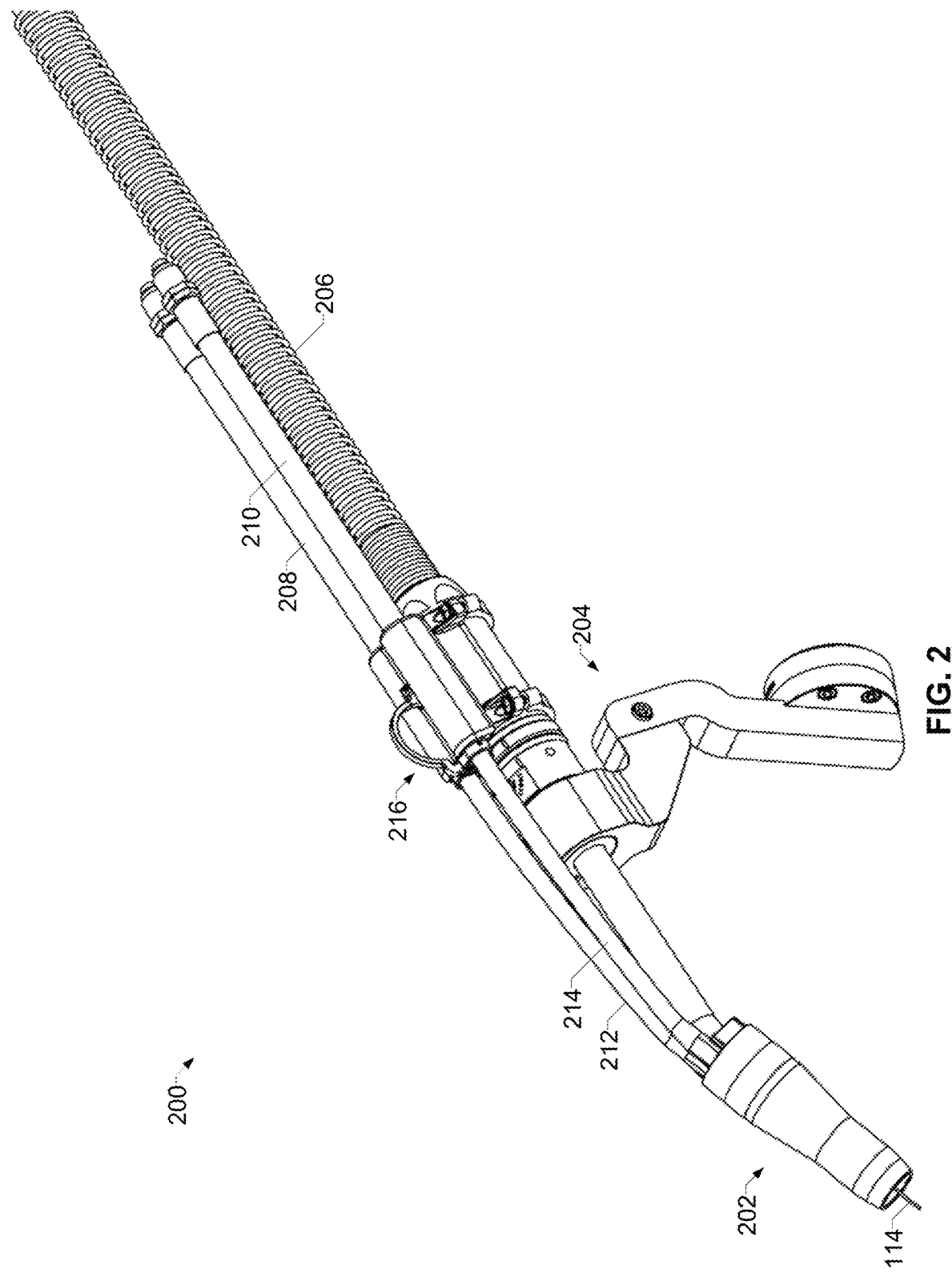
FIG. 2 illustrates an example liquid-cooled welding torch, in accordance with aspects of this disclosure.

FIG. 2 illustrates an example liquid-cooled welding torch 200. The liquid-cooled welding torch 200 may be used to implement the welding tool 108 of FIG. 1 to deliver the electrode wire 114 to a workpiece while providing both resistive preheating power and welding-type power.

The liquid-cooled welding torch 200 includes a welding assembly 202, a mounting assembly 204, a weld cable 206, liquid cooling assemblies 208, 210, 212, 214, and a power and liquid transfer assembly 216. As disclosed herein, the example liquid-cooled welding torch 200 may be used to replace conventional robotic welding torches with resistive preheating-enabled welding torches having a same tool center point (TCP). By replacing a torch with another torch having a same TCP, the robot may be capable of continuing a welding program using the replacement torch with little or no reprogramming of tool points.

The welding assembly 202 receives weld current and preheating current, conducts the weld current to the electrode wire 114, and conducts the preheating current through a portion of the electrode wire 114. The example welding assembly 202 is liquid-cooled by liquid provided via the liquid cooling assemblies 208-214. The example welding assembly 202 of FIG. 2 receives the weld current via one or more of the weld cable 206, the liquid cooling assemblies 208 and 212, and/or the liquid cooling assemblies 210 and 214. Because the workpiece provides the return path for the weld current to the power supply, no return path is provided via the weld cable 206 or the liquid cooling assemblies 208. The weld cable 206 is an air-cooled (or gas-cooled) cable. However, the weld cable 206 may also be liquid-cooled.

The example welding assembly 202 receives the preheating current via the weld cable 206, the liquid cooling assemblies 208 and 212, and/or the liquid cooling assemblies 210 and 214. In the example of FIG. 2, the weld current is conducted via a different one of the weld cable 206, the liquid cooling assemblies 208 and 212, or the liquid cooling assemblies 210 and 214 than the preheating current that has the same polarity (i.e., current flow direction). The welding assembly 202 conducts the preheating current through a section of the electrode wire 114 to heat the electrode wire via resistive heating (e.g., $I^2R$ heating). The preheat current then returns to a preheating power supply via a different one of weld cable 206, the liquid cooling assemblies 208 and 212, or the liquid cooling assemblies 210 and 214 to complete a preheating circuit.

In the example of FIG. 2, the weld current path, the preheating current supply path, and the preheating current return path may all be different ones of the weld cable 206, the liquid cooling assemblies 208 and 212, and the liquid cooling assemblies 210 and 214. In some examples, the weld current path may be superimposed with the preheating current supply path or the preheating current return path to reduce the net current in the conductor. For example, if the weld current is 300 A and the preheating current is 100 A, the weld current and the preheating current may be superimposed to result in a net current of 200 A.

As described in more detail below, the welding assembly 202 and the liquid cooling assemblies 212, 214 may be separated from the remainder of the liquid-cooled welding torch 200 via the power and liquid transfer assembly 216.

Figure 3:
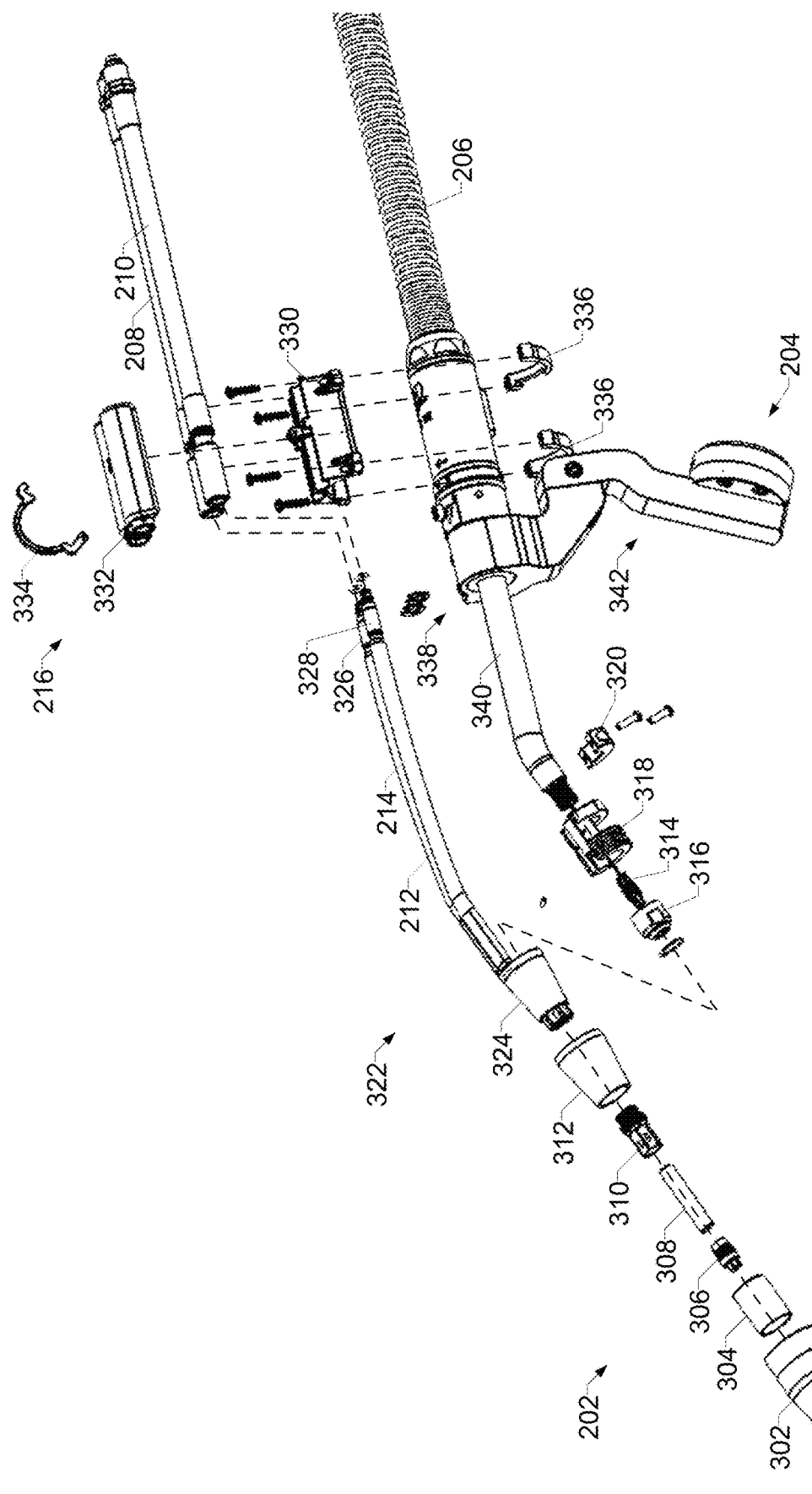
FIG. 3 illustrates an exploded view of the example liquid-cooled welding torch of FIG. 2.

FIG. 3 illustrates an exploded view of the example liquid-cooled welding torch 200 of FIG. 2.

As shown in FIG. 3, the example welding assembly 202 includes a nozzle 302, a diffuser insulator 304, a first contact tip 306, a wire guide 308, a gas diffuser 310, a first contact tip insulator 312, a second contact tip 314, a second contact tip insulator 316, a nozzle mount 318, and a nozzle mount clamp 320.

A liquid-cooled power cable assembly 322 includes the liquid cooling assemblies 212, 214, a cooler 324, and power connector pins 326, 328. The liquid-cooled power cable assembly 322 is described below in more detail with reference to FIGS. 6, 7A, 7B, and 8.

The power and liquid transfer assembly 216 enables quick separation of the welding assembly 202 and the liquid-cooled power cable assembly 322 from the mounting assembly 204. In the example of FIG. 3, the power and liquid transfer assembly 216 includes a saddle 330, a saddle cover 332, a saddle clasp 334, and saddle clamps 336. The power and liquid transfer assembly 216 is described below in more detail with reference to FIGS. 4 and 5.

The example mounting assembly 204 includes a torch body 338, a neck 340, and a robot link assembly 342 including, for example, a bracket, a link arm, and a robot mounting disk.

FIG. 4 is a more detailed depiction of an example liquid cooling assembly 400 that may be used to implement the liquid cooling assemblies 208, 210 of FIG. 2. FIG. 5 is a cross-section view of the liquid cooling assembly 400 of FIG. 4.

The liquid cooling assembly 400 includes a power cable socket 402 that holds a power transfer socket 404 and a liquid shutoff valve 406. The liquid cooling assembly 400 also includes a hose 408 and an internal conductor 410. The hose 408 is coupled to the power cable socket 402 on a first end and coupled to a power cable fitting 412 on a second end.

The power cable socket 402 receives one of the power connector pins 326, 328 to transfer cooling liquid and welding current and/or preheating current to a corresponding one of the liquid cooling assemblies 212, 214. The power transfer socket 404 enables insertion of the power connector pin 326, 328, and transfers current to and/or from an inserted power connector pin 326, 328. An example power transfer socket that may be used to implement the power transfer socket 404 is a PowerBud® power contact, sold by Methode Electronics, Inc., which provides multiple contact points between the power transfer socket and an inserted power connector pin 326, 328.

The liquid shutoff valve 406 selectively permits flow of liquid from the hose 408 to the power transfer socket 404 and to a connected liquid cooling assembly 212, 214. The example liquid shutoff valve 406 is a Schrader valve. However, other types of valves may be used to implement the liquid shutoff valve 406. When a power connector pin 326, 328 is inserted (e.g., fully inserted) into the power transfer socket 404, the power connector pin 326, 328 displaces (e.g., unseats) a stem 414 from a core 416 of the valve 406, which permits liquid to flow to and/or from the hose 408. When the power connector pin 326, 328 is removed or partially removed, the stem 414 is forced back into the core 416 and stops flow of liquid.

The hose 408 is coupled to the power cable fitting 412 via a ferrule 418 and a fitting nut 420. The power cable fitting 412 is coupled to a source of weld current and/or preheating current, and is electrically connected to transfer the weld current and/or preheating current to or from the internal conductor 410 of the hose 408. The hose 408 is also coupled to the power cable socket 402 via a ferrule 418. The example power cable fitting 412, the example power cable socket 402, and/or the hose 408 include hose barbs to secure the hose 408. However, other methods of securing the hose to the power cable fitting 412 and/or the power cable socket 402 may be used, such as clamps, compression fittings, or any other hose fittings.

During operation, when the power cable fitting 412 is coupled to a power source and a liquid cooling device, and the power cable socket 402 is coupled to a liquid cooling assembly 212, 214, the example liquid cooling assembly 400 permits liquid to flow through the power cable fitting 412, the hose 408, the valve 406, the power cable socket 402, and the power transfer socket 404, either to or from the liquid cooling device (e.g., based on whether the assembly is configured as the liquid supply or the liquid return). The example liquid cooling assembly 400 also conducts current from and/or to a weld power supply and/or a preheating power supply. For example, the current is conducted through the power cable fitting 412, the internal conductor 410, the power cable socket 402, and the power transfer socket 404.

Figure 6:
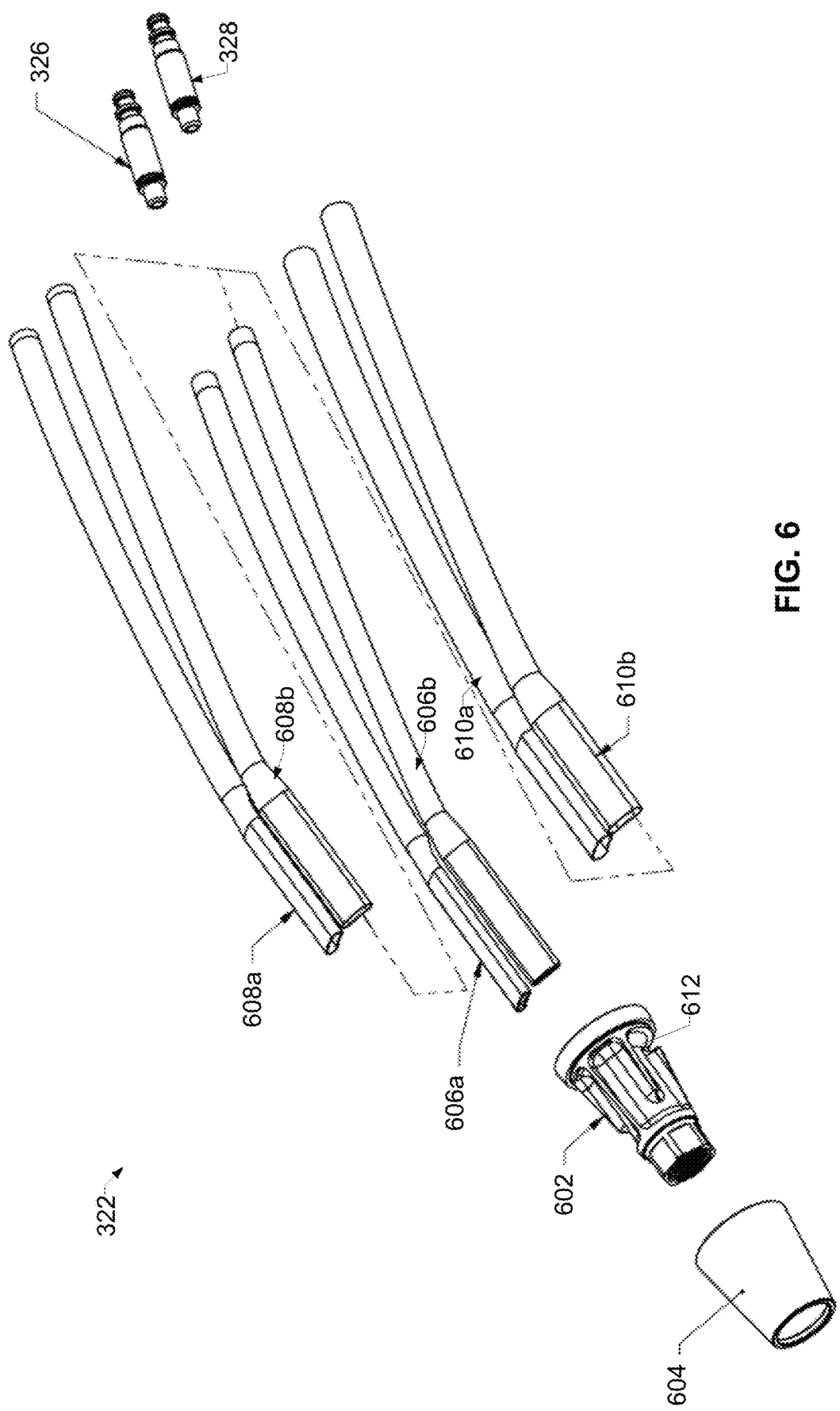
FIG. 6 is an exploded view of the example liquid-cooled power cable assembly of FIG. 3.
Figure 7:
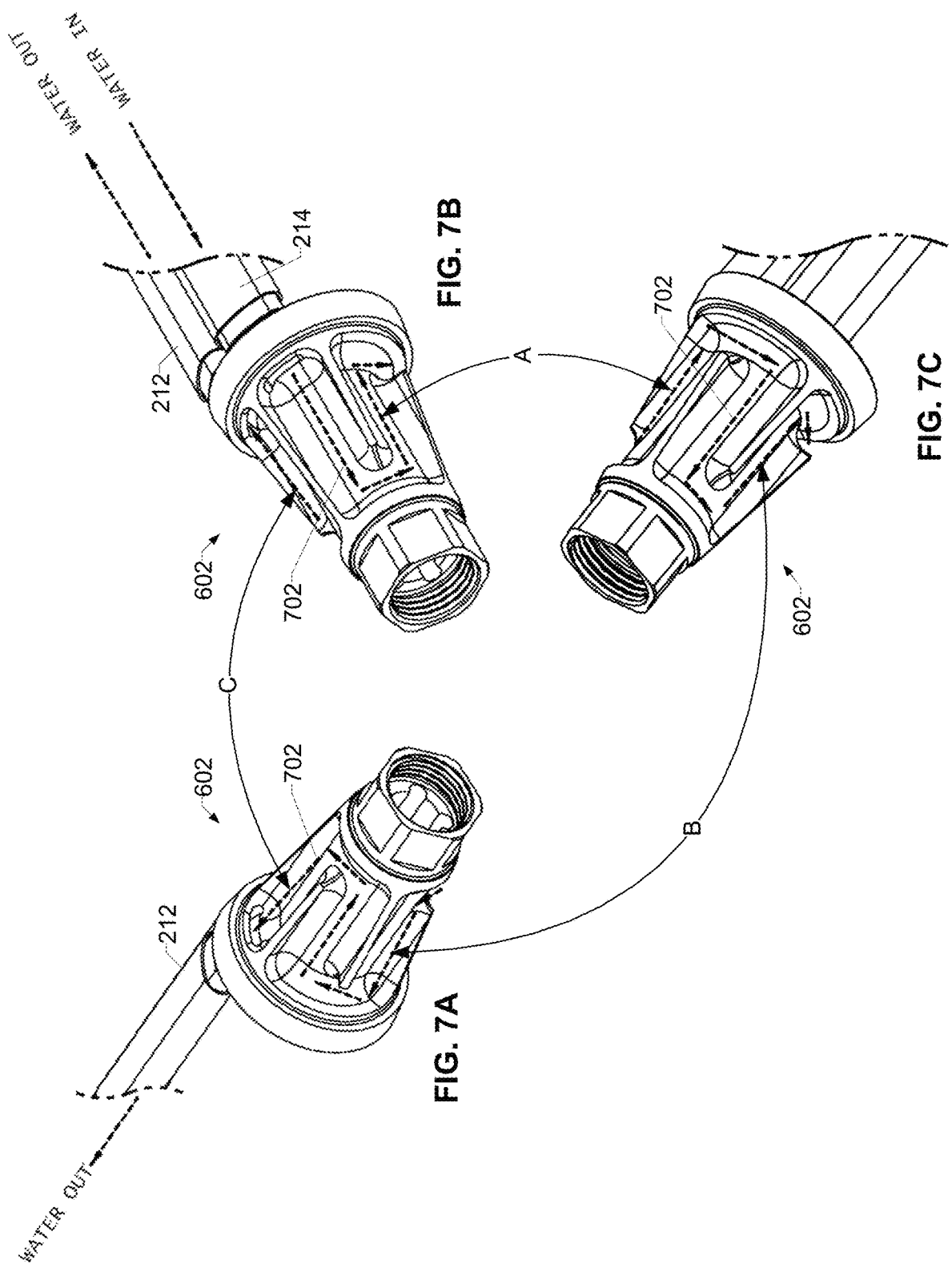
FIGS. 7A, 7B, and 7C are views of the example cooler body of FIG. 6.

FIG. 6 is an exploded view of the example liquid-cooled power cable assembly 322 of FIG. 3. The liquid-cooled power cable assembly 322 provides cooling liquid supply and return paths from the liquid cooling assemblies 212, 214 to the welding assembly 202 of FIG. 3. The liquid-cooled power cable assembly 322 includes the liquid cooling assemblies 212, 214, the power connector pins 326, 328, a cooling body 602, and a cooling body cover 604.

Each of the example liquid cooling assemblies 212, 214 includes three layers: an inner conductive layer 606a, 606b; an insulative layer 608a, 608b; and an outer protective layer 610a, 610b. The inner conductive layer 606a, 606b conduct current and liquid, and is constructed of a conductive material such as copper. The insulative layers 608a, 608b provide electrical insulation between the inner conductive layers 606a, 606b and the outer protective layers 610a, 610b. The example insulative layers 608a, 608b may be silicone, PTFE, PET, and/or any other suitable electrically insulative material or combination of materials. The outer protective layers 610a, 610b provide rigidity and/or physical protection from damage, such as punctures. The outer protective layers 610a, 610b may be a rigid material such as aluminum or any other appropriate material or combination of materials.

In some examples, two or more of the layers 606a-610a, 606b-610b may be combined. For example, the insulative layers 608a, 608b may also serve as the outer protective layers 610a, 610b, or vice versa. In other examples, the outer protective layers 610a, 610b may be omitted.

The inner conductive layers 606a, 606b are contained within the insulative layers 608a, 608b. The insulative layers 608a, 608b are similar contained within the outer protective layers 610a, 610b.

One of the liquid cooling assemblies 212, 214 supplies cooling liquid to the cooling body 602, and the other of the liquid cooling assemblies 212, 214 receives the liquid from the cooling body 602. The cooling body 602 circulates the liquid through a tortuous path 612 between a liquid input port and a liquid output port. The cooling body 602 is coupled to the welding assembly 202 to conduct heat from the components in the welding assembly 202 to the liquid, thereby cooling the welding assembly 202. The cooling body cover 604 is attached to the cooling body 602 to contain the fluid within the tortuous path 606. In some examples, the cooling body 602 and a cooling body cover 604 may be a single unit (e.g., constructed using additive manufacturing techniques).

FIGS. 7A, 7B, and 7C are views of the example cooler body 602 of FIG. 6. As illustrated in FIGS. 7A, 7B, and 7C, the tortuous path 612 includes a continuous path around a circumference of the cooler body 602. In the illustrated example, the liquid cooling assembly 214 supplies cooling liquid to the cooler body 602 and the liquid cooling assembly 212 returns the cooling liquid to a liquid cooler. The cooling liquid follows a flow path 702 (shown using a dotted line) through the tortuous path 612 to increase heat transfer from the welding assembly 202 to the liquid. Continuities A and B from one view to the next are shown in FIGS. 7A, 7B, and 7C.

Figure 8:
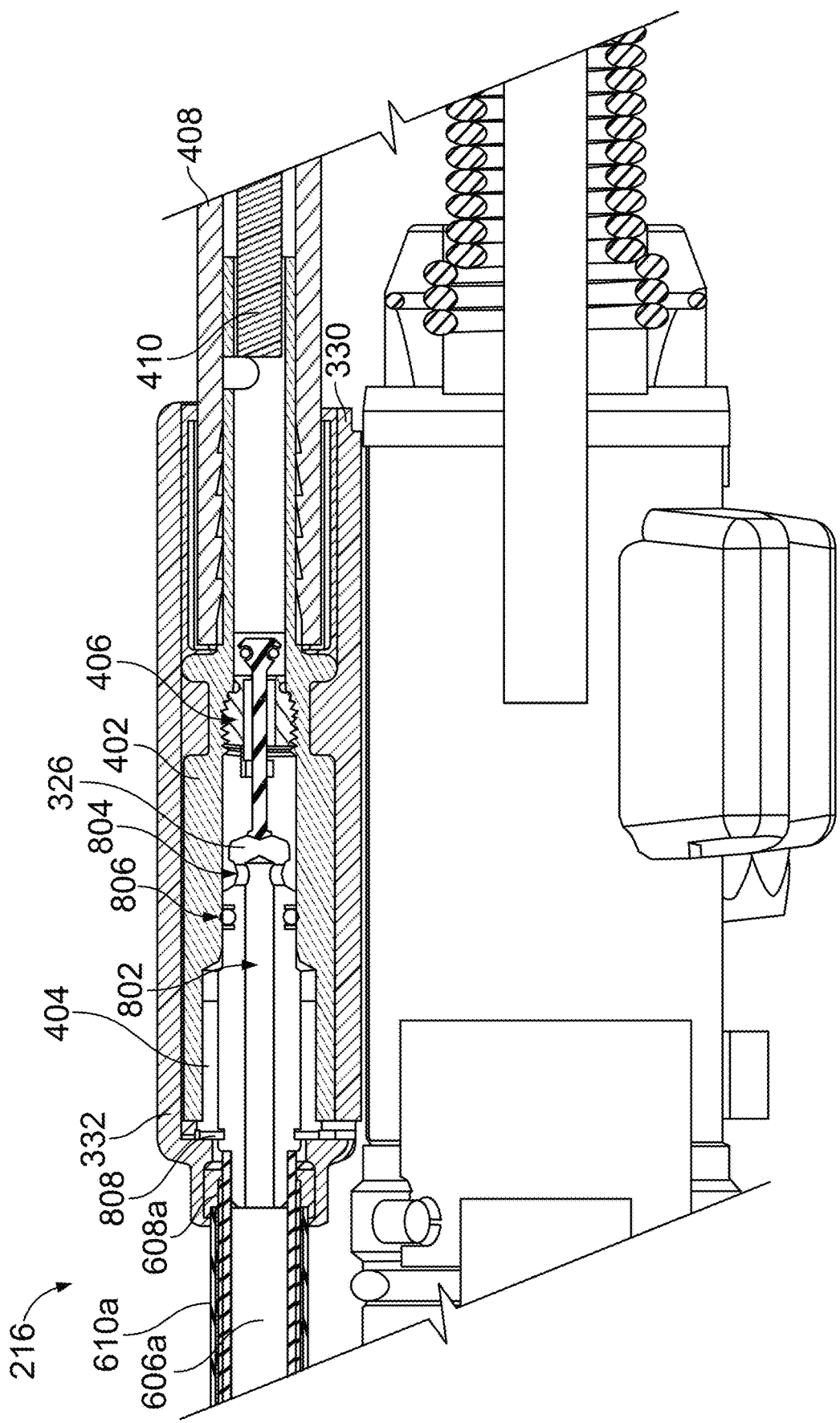
FIG. 8 is a cross-section view of the liquid cooling assembly and the quick-disconnect assembly of FIG. 2 coupled to the liquid cooling assembly of FIG. 4.

FIG. 8 is a cross-section view of the liquid cooling assembly 212, 214 and the power and liquid transfer assembly 216 of FIG. 2 coupled to the liquid cooling assembly 400 of FIG. 4.

As illustrated in FIG. 8, the power cable socket 402 is seated in the saddle 330, which prevents movement of the power cable socket 402. The example power connector pin 326 is inserted into the power cable socket 402 and the power transfer socket 404. The power connector pin 326 includes an inner liquid coolant passage 802, one or more liquid coolant ports 804 to enable liquid to flow into and/or out of the liquid coolant passage 802, and a seal 806. When inserted, the power connector pin 326 opens the valve 406 to permit liquid to flow through the valve 406, the liquid coolant ports 804, the liquid coolant passage 802, and the inner conductive layer 606a. A retaining ring 808 may be included in the saddle cover 332 to hold the power connector pin 326 in place.

In addition to placing the liquid cooling assembly 212 in fluid communication with the liquid cooling assembly 208, the example power connector pin 326 also conducts weld current and/or preheating current between the liquid cooling assembly 212 and the liquid cooling assembly 208. The example inner conductive layer 606a is in electrical contact with the power transfer pin 326, which is a conductive material (e.g., copper) and is in electrical contact with the power transfer socket 404.

While the examples are described with reference to the liquid cooling assembly 208, the liquid cooling assembly 212, and the power connector pin 326, these examples are similarly applicable to the liquid cooling assembly 210, the liquid cooling assembly 214, and the power connector pin 328.

Figure 9:
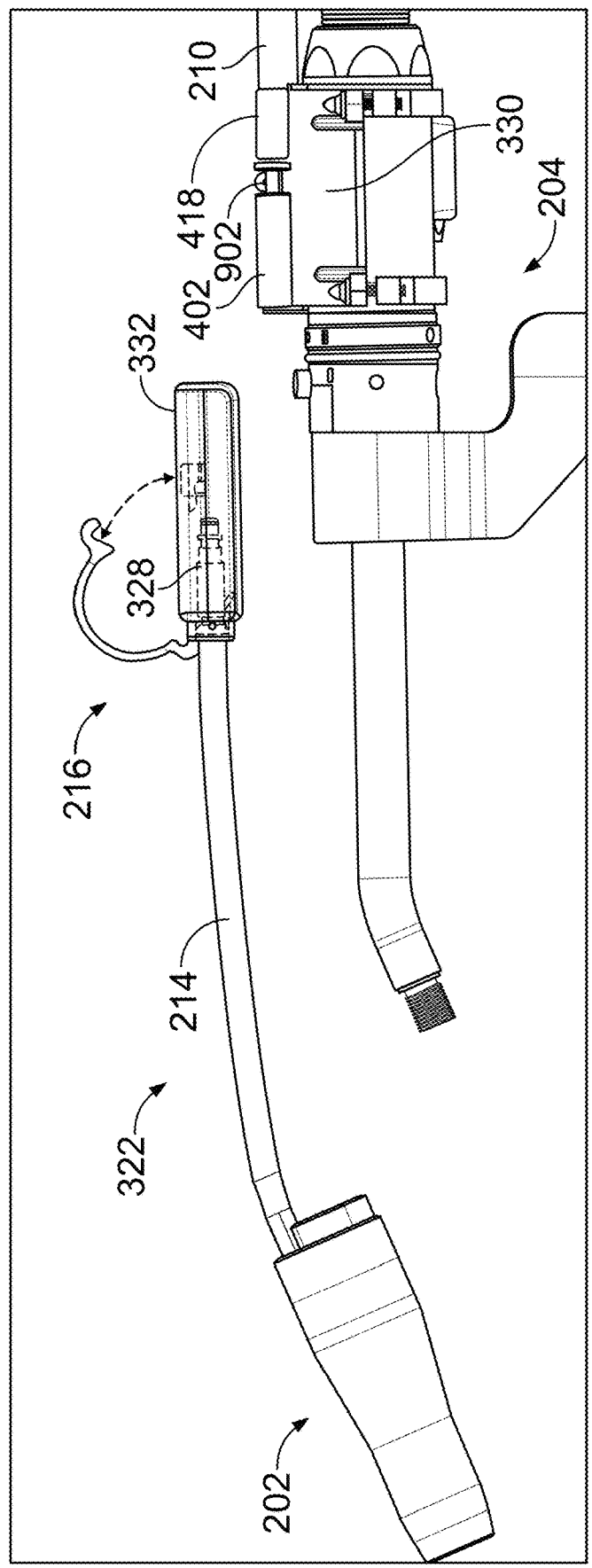
FIG. 9 illustrates the example welding assembly and the example liquid cooling assemblies of FIG. 2 disconnected from the remainder of the torch via the quick-disconnect assembly.

FIG. 9 illustrates the example welding assembly 202 and the example liquid cooling assemblies 212, 214 of FIG. 2 disconnected from the remainder of the torch 200 via the power and liquid transfer assembly 216. For detachment of the example liquid cooling assemblies 212, 214, the example saddle clasp 334 is unhooked or otherwise detached from a retention pin 902 on the saddle 330. When the saddle clasp 334 is unhooked, the power connector pin 328 can be disengaged from the power cable socket 402 and the saddle cover 332 can be simultaneously lifted from the saddle 330. Conversely, to install the liquid cooling assemblies 212, 214, the power connector pins 326, 328 are inserted into corresponding power cable sockets 402 while the saddle cover 332 is placed onto the saddle 330. When the power connector pins 326, 328 and the saddle cover 332 are in place on the saddle 330, the saddle clasp 334 is hooked into the retention pin 902 to hold the power connector pins 326, 328 in place.

Figure 10:
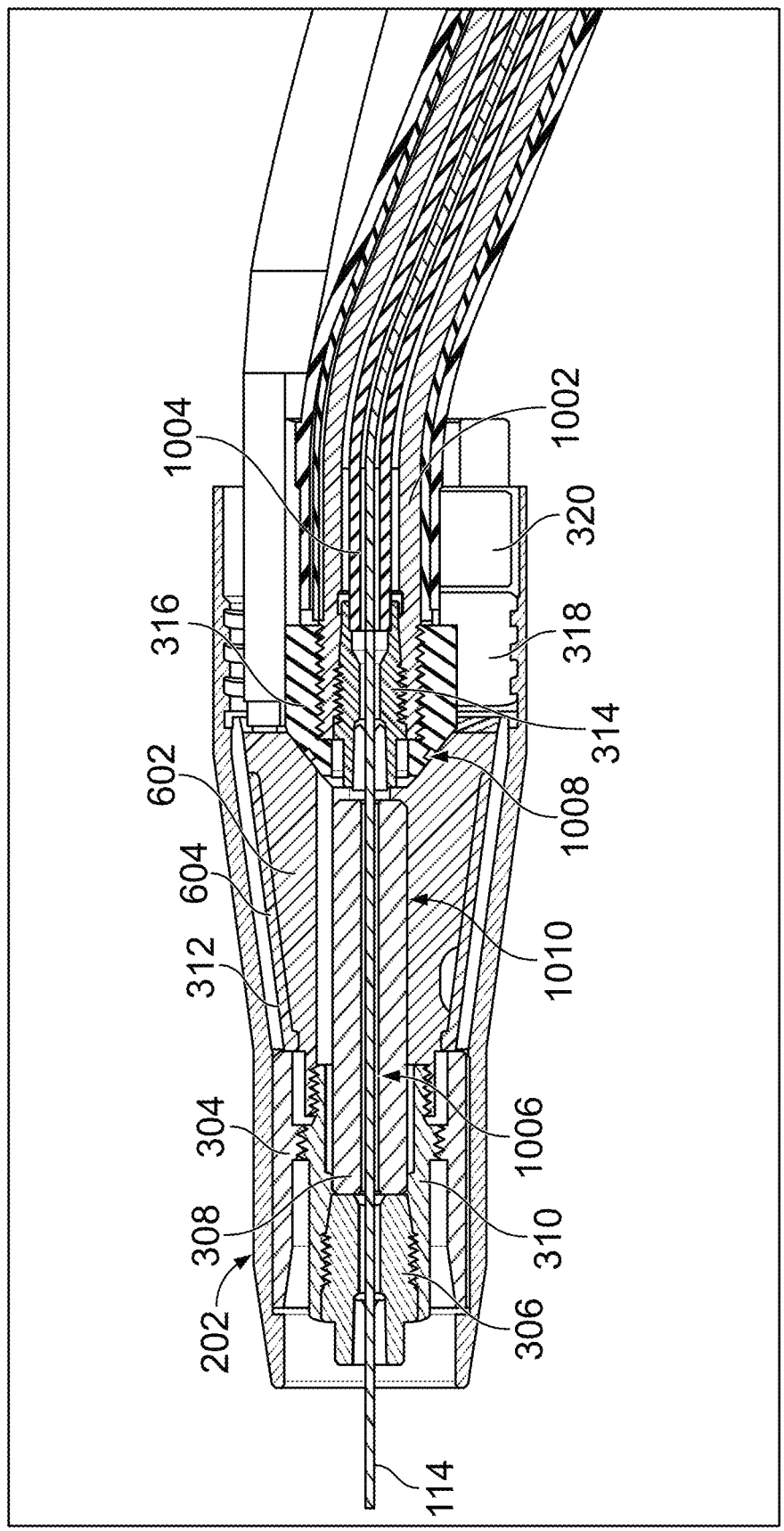
FIG. 10 is a cross-section view of the example welding assembly of FIG. 2.

FIG. 10 is a cross-section view of the example welding assembly 202 of FIG. 2. The welding assembly 202 is liquid-cooled via the liquid cooling assemblies 212, 214. The liquid cooling assemblies 212, 214 and/or a torch neck 1002 provide weld current and preheating current to the welding assembly 202 for preheating the electrode wire 114 and for generating a welding arc.

The example welding assembly 202 includes the nozzle 302, the diffuser insulator 304, the first contact tip 306, the wire guide 308, the gas diffuser 310, the first contact tip insulator 312, the second contact tip 314, the second contact tip insulator 316, the nozzle mount 318, the nozzle mount clamp 320, the cooling body 602, and the cooling body cover 604. The welding assembly 202 is attached to a torch neck 1002, through which a wire liner 1004 conveys the electrode wire 114 and/or shielding gas to the welding assembly 202.

The first contact tip 306 delivers welding current to the electrode wire 114 for arc welding. The first contact tip 306 is threaded into a gas diffuser 310, which is in turn threaded into the diffuser insulator 304. The diffuser insulator 304 provides electrical and thermal insulation between the gas diffuser 310 and the nozzle 302.

The gas diffuser 310 is threaded into the cooling body 602. The cooling body 602 conducts welding current and/or preheating current from the liquid-cooled power cable assembly 322 (e.g., from the inner conductive layer(s) 606a, 606b) to the diffuser 310, which is electrically connected to the first contact tip 306. The first contact tip insulator 312 and the diffuser insulator 304 provide electrical insulation between the weld current and preheat current path(s) and the nozzle 302.

The second contact tip 314 is electrically coupled to the torch neck 1002 to conduct preheating current to and/or from the electrode wire 114. The preheating circuit includes the torch neck 1002, the second contact tip 314, the first contact tip 306, a portion of the electrode wire 1006 between the second contact tip 314 and the first contact tip 306, the diffuser 310, the cooling body 602, and one or both of the inner conductive layers 606a, 606b in the liquid-cooled power cable assembly 322.

The second contact tip insulator 316 provides electrical insulation between the second contact tip 314 and the cooling body 602. The second contact tip insulator 316 includes a seal 1008 (e.g., an o-ring) to reduce or prevent welding gas leakage.

The nozzle mount 318 and the nozzle mount clamp 320 provide an attachment point for threading the welding assembly 202 onto the torch neck 1002. The nozzle mount 318 physically couples and/or provides support to the liquid-cooled power cable assembly 322 from the torch neck 1002, which is rigid.

In addition to the welding assembly 202, the liquid-cooled power cable assembly 322, and the torch neck 1002 being detachable from the mounting assembly 204 (e.g., via the power and liquid transfer assembly 216 and a conventional disconnection feature between the torch neck 1002 and the mounting assembly 204), the welding assembly 202 may be completely or partially disassembled to access one or more of the components in the welding assembly 202.

Figure 12B:
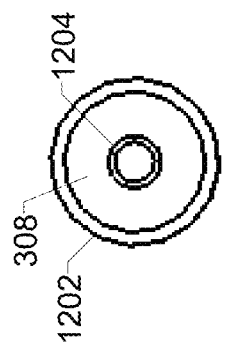
FIGS. 12A and 12B show an example implementation of the wire guide of FIG. 10.
Figure 12A:
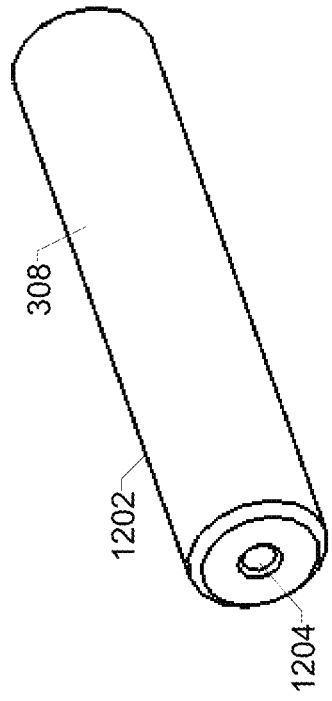
Figure 11B:
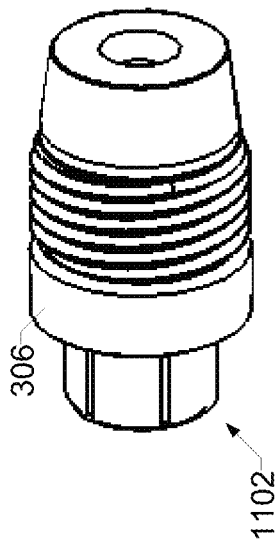
FIGS. 11A, 11B, and 11C show an example implementation of the first contact tip of FIG. 10.
Figure 11C:
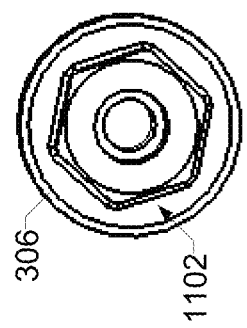
Figure 11A:
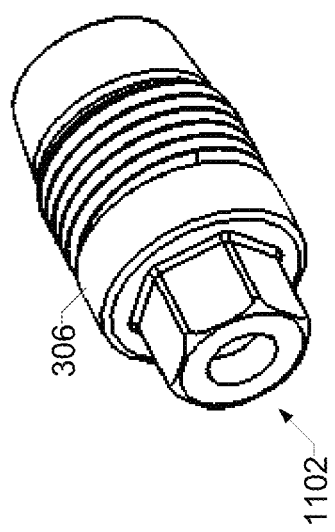

In the example of FIG. 10, the first contact tip 306, the wire guide 308, and/or the second contact tip 314 are removable via the tip of the nozzle 302. FIGS. 11A, 11B, and 11C show an example implementation of the first contact tip 306, FIGS. 12A and 12B show an example implementation of the wire guide 308, and FIGS. 13A, 13B, and 13C show an example implementation of the second contact tip 314.

As shown in FIGS. 10 and 11A, a first end 1102 of the first contact tip 306 has a hexagonal cross-section. The hexagonal cross-section enables the first contact tip 306 to be unthreaded from the diffuser 310 via the opening in the nozzle 302. Other exterior geometries may be used for the cross-section of the first end 1102 of the first contact tip 306. Additionally or alternatively, an interior geometry may be used (e.g., in combination with a corresponding tool) to unthread the first contact tip 306 from the diffuser 310.

After removal of the first contact tip 306 from the welding assembly 202 via the nozzle 302, the wire guide 308 may also be removed via the nozzle 302. As shown in FIGS. 10, 12A, and 12B, an outer surface 1202 of the wire guide 308 is relatively smooth (e.g., not threaded) and can be inserted into and removed from of an inner diameter 1010 of the cooling body 602 without threading. The wire guide 308 has a wire path 1204 to guide the wire from the second contact tip 314 to the first contact tip 306. In some examples, the wire guide 308 is a nonconductive material such as ceramic, so that the electrode wire 114 is the only conductive path between the second contact tip 314 and the first contact tip 306.

As shown in FIGS. 13A, 13B, and 13C, the second contact tip 314 includes a hexagonal cross-section on a first end 1302 of the second contact tip 314. An interior surface 1304 and/or an exterior surface 1306 (e.g., a head) of the first end 1302 may provide the hexagonal cross-section and/or any other shape that enables the second contact tip to be unthreaded from the torch neck 1002. The example second contact tip 314 includes threads 1305 to enable the second contact tip 314 to be threaded into the second contact tip insulator 316. The exterior surface 1306 has a smaller diameter than the major diameter of the threads 1305, which can improve access to the exterior surface 1306 for removal and/or installation of the second contact tip 314.

As shown in FIG. 10, the outer diameter of the second contact tip 314 is equal to or less than the inner diameter 1010 of the cooling body 602 and less than an inner diameter 1012 of the second contact tip insulator 316 to enable the second contact tip 314 to be removed via the tip of the nozzle 302, the cooling body 602, and the second contact tip insulator 316. The first end 1302 may be manipulated (e.g., via a tool inserted through the nozzle 302) to unthread the second contact tip 314 from the torch neck 1002, after which the second contact tip 314 can be removed from the welding assembly 202 without disassembly of the welding assembly 202.

As shown in FIGS. 13A, 13B, and 13C, the second contact tip 314 includes slots 1308 running longitudinally on the exterior of the second contact tip 314 through the threads 1305. The slots 1308 permit the flow of welding gas from the interior of the torch neck 1002 to the diffuser 310 via the cooling body 602 (e.g., through the interior of the cooling body 602 through and/or around the wire guide 308.

The second contact tip 314 includes a first bore 1310 having a first diameter. The electrode wire 114 makes electrical contact with the first bore 1310. The example second contact tip 314 may also have a second, larger bore 1312 on a rear side of the contact tip 314 from the first bore 1310. The length of the second bore 1312 may be selected to control a contact length of the first bore 1310.

As illustrated in FIG. 10, the example contact tip 314 may have an insert 1012 inserted within the first bore 1310 to improve contact with the electrode wire 114, improve current transfer with the electrode wire 114, and/or improve mechanical strength at operating temperatures.

Figure 14B:
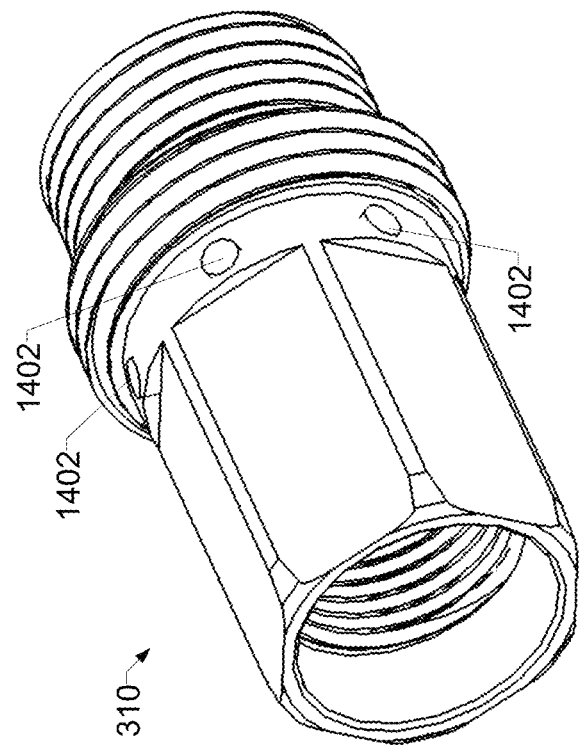
FIGS. 14A and 14B illustrate views of the example diffuser of FIGS. 3 and 10.
Figure 14A:
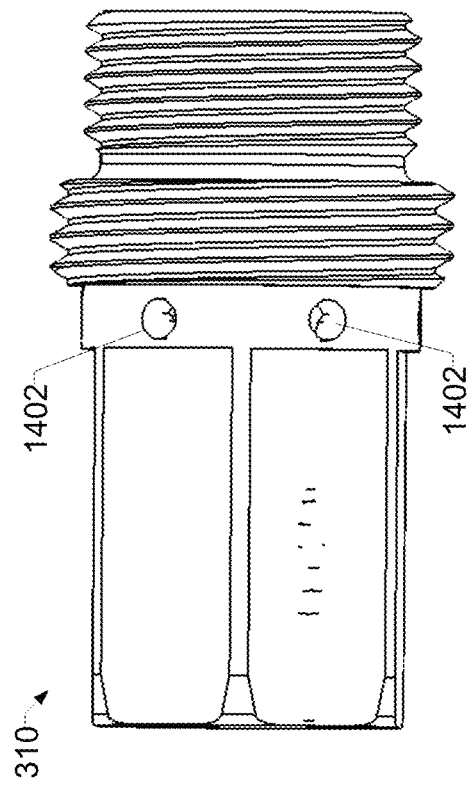

FIGS. 14A and 14B illustrate views of the example diffuser 310 of FIGS. 3 and 10. As discussed above with reference to FIG. 10, the diffuser 310 includes two sets of exterior threads for installation into the diffuser insulator 304 and the cooling body 602, and a set of interior threads for installation of the first contact tip 306 into the diffuser 310. The diffuser 310 includes gas outlets 1402 to enable the flow of gas from the inner diameter 1010 of the cooling body 602 to the nozzle 302 for output to the weld.

Figure 15A:
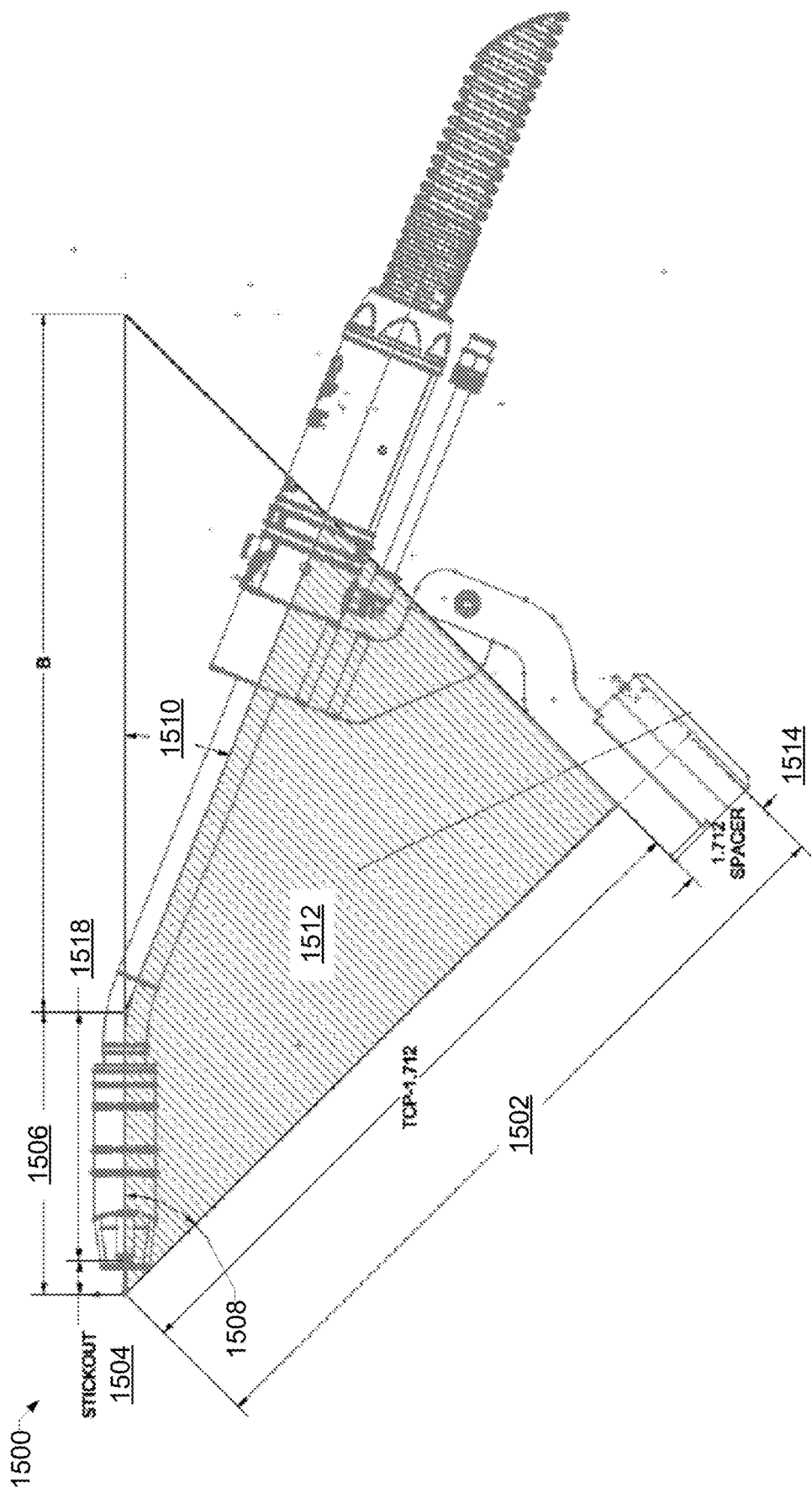
FIG. 15A illustrates a conventional robotic welding torch having a first tool center point distance and torch neck angle, in accordance with aspects of this disclosure.

FIG. 15A illustrates a conventional robotic welding torch 1500 having a first tool center point distance and torch neck angle. FIG. 15B illustrates an example implementation of the liquid-cooled welding torch 200 of FIG. 2 configured to replace the conventional torch 1500 of FIG. 15A while maintaining a same tool center point distance and torch neck angle.

The tool center point distance 1502 of the conventional torch 1500 is a function of a stickout distance 1504, a nozzle length 1506, a nozzle angle 1508, a neck bend angle 1510, a tool center point area 1512, and a spacer width 1514. The tool center point area 1512 (e.g., Area$_{TCP}$) is defined using Equation 1 below:

Area$_{TCP}$=0.5*((TCP–spacer width 1514)$^2$*TAN (nozzle angle 1508)+((TCP–spacer width 1514)–(nozzle length 1506+stickout 1504)*COS (nozzle angle 1508))$^2$*(TAN(nozzle angle 1508–neck bend angle 1510)–1))   (Equation 1)

The example welding assembly 202 described above with reference to FIGS. 10, 11A-11C, 12A, 12B, 13A-13C, 14A, and/or 14B may have a same nozzle length 1506 as conventional nozzles. In other examples, the welding assembly 202 may require a longer nozzle 302 than a nozzle of the conventional torch. In some examples, such as the welding torch described below with reference to FIGS. 19-23, the welding assembly may have a nozzle that is shorter than conventional nozzles. However, the length of the example torch neck 1002 and/or the length and/or one or more dimensions of the example mounting assembly 204 may be adjusted to compensate for differences in the nozzle length.

Using the example welding assembly 202 disclosed herein, the example liquid-cooled welding torch 200 may be dimensioned to be a replacement for any standard tool center point distance (e.g., 350 mm, 400 mm, 450 mm, 500 mm, etc.) and/or torch neck angle (e.g., 0 degree, 22 degree, 35 degree, 45 degree, etc.) to maintain the same TCP, torch neck angle, and tool center point area after replacement. In other words, disclosed example welding assemblies 202 and/or liquid-cooled welding torches 200 may be used as replacements for conventional robotic weld torches such that a robot on which the replacement occurs does not require reprogramming or recalibration of new tool center point(s) or torch neck angle(s). After replacement of the conventional welding torch with disclosed example liquid-cooled welding torches, the robot subject to replacement is capable of higher deposition rates, improved welding starts, and/or other advantages over conventional welding torches. As a result, reprogramming of welding voltages, currents, and/or torch travel speeds may be performed to realize the advantages of the liquid-cooled welding torch 200 for previously programmed welding tasks.

In addition to the tool center point distance 1502, the stickout distance 1504, the nozzle length 1506, the nozzle angle 1508, the neck bend angle 1510, the tool center point area 1512, and the spacer width 1514 dimensions of the conventional welding torch 1500, the example welding torch 200 includes a preheat distance 1516 within the nozzle. The nozzle length 1506 is subdivided into the stickout distance 1504, the preheat distance 1516, and a neck-to-contact tip length 1518. The conventional torch 1500 may be considered to have a preheat distance 1516 of 0. By replacing a conventional weld torch 1500 with a weld torch 200 having substantially the same tool center point distance 1502, the stickout distance 1504, the nozzle length 1506, the nozzle angle 1508, the neck bend angle 1510, and the tool center point area 1512, the replacement reduces the programming needed to avoid an increased risk of collisions.

Tables 1 and 2 below illustrates example comparisons of the dimensions 1502-1516 for two example tool center point distances 1502, 350 mm and 400 mm.

TABLE 1

350 mm TCP Dimensions for Conventional and Disclosed example welding torches

| # | TCP (mm) | TCP (in) | Stickout (in) | Preheat (in) | Neck-to-contact tip length (in) | Nozzle length (in) | Nozzle angle (deg.) | Neck angle (deg.) | TCP area (sq. in.) |
|---|---|---|---|---|---|---|---|---|---|
| 1 | 350 | 13.78 | 0.59 | 0.00 | 4.33 | 4.92 | 45 | 22 | 51.59 |
| 2 | 350 | 13.78 | 0.75 | 3.29 | 1.78 | 5.82 | 45 | 22 | 54.61 |
| 3 | 350 | 13.78 | 0.75 | 2.40 | 1.78 | 4.93 | 45 | 22 | 51.61 |

TABLE 2

400 mm TCP Dimensions for Conventional and Disclosed example welding torches

| # | TCP (mm) | TCP (in) | Stickout (in) | Preheat (in) | Neck-to-contact tip length (in) | Nozzle length (in) | Nozzle angle (deg.) | Neck angle (deg.) | TCP area (sq. in.) |
|---|---|---|---|---|---|---|---|---|---|
| 4 | 400 | 15.75 | 0.59 | 0.00 | 4.33 | 4.92 | 45 | 22 | 66.44 |
| 5 | 400 | 15.75 | 0.75 | 3.29 | 1.78 | 5.82 | 45 | 22 | 70.17 |
| 6 | 400 | 15.75 | 0.75 | 2.40 | 1.78 | 4.93 | 45 | 22 | 66.46 |

A welding torch having a preheat length of 3.29 inches (e.g., torches 2 and 5 of Tables 1 and 2 above) may be used with an air-cooled torch. A welding torch having a preheat length of 2.40 inches results in a nozzle length 1506 and TCP area 1512 of a welding torch 200 that substantially match the nozzle length and TCP area 1512 of the conventional torch 1500. However, the current density may increase enough to require an increase in the radius of the welding assembly 202 (e.g., increased components in the welding assembly 202) to continue to use air cooling (as in torches 2 and 5 of Tables 1 and 2). Additionally or alternatively, the preheat distance of 2.40 inches may be used with the example liquid cooled welding torch 200 disclosed herein.

Any of the dimensions of Tables 1 and 2 (or similar dimensions) may be selected based on a specification of another of the dimensions. For example, the preheating length (and, thus, the dimensions of the welding assembly) may be selected based on any of the TCP, the stickout, the neck-to-contact tip length, the nozzle length, the nozzle angle, the neck angle, and/or the TCP area. Additionally or alternatively, the neck-to-contact tip length is based on at least one of a nozzle length, a preheat distance, a nozzle angle, or a neck angle.

Preheat lengths 1516 that are longer than the 3.29 inches of the examples of Tables 1 and 2 may result in a torch envelope that is larger than the envelope of the conventional torches 1500 by more than an acceptable amount. Torches having an envelope that is excessively large may require more robot programming to serve as a replacement for a conventional torch and/or has a higher chance of collision during operation. Additional programming and collisions are undesirable effects of replacement, and disclosed examples reduce or prevent such effects while providing the benefits of electrode preheating at the welding assembly 202.

While the example welding assembly 202 includes the first contact tip 306 and the second contact tip 314 such that both of the contact tips 306, 314 are on a distal end of the bend in the torch neck 1002, in some other examples the second contact tip 314 is on a proximal side of the bend in the torch neck 1002. Additionally or alternatively, a third contact tip is further located on the proximal side of the bend in the torch neck 1002 so that preheating occurs between the second contact tip 314 (on either side of the bend) and the third contact tip (on the proximal side of the bend).

When the electrode wire 114 is heated beyond a particular temperature, the column strength of the electrode wire 114 may be reduced to a point that the heated electrode wire 114 can no longer be pushed around the bend in the torch neck 1002 without buckling. In some such examples, the liquid-cooled welding torch 200 is provided with a pull motor to assist the push motor located in the wire feeder.

The bend in the torch neck 1002 may be provided with ceramic bearings to reduce the friction force between the wire liner 1004 and the electrode wire 114, which increases the temperature to which the electrode wire 114 may be preheated before buckling becomes likely.

In some examples, the length between the first and second contact tips 306, 314 (e.g., the preheat length) is adjustable to change the length of the electrode wire 114 that is being preheated. As the preheat length increases, the energy added to the electrode wire 114 is increased per unit of current. To change the preheat length, one or both of the contact tips 306, 314 may be configured to be translated in the axial direction via manual and/or automatic methods.

Using the second contact tip 314 as an example, the second contact tip 314 may be threaded into an intermediate device between the second contact tip 314 and the torch neck 1002. The intermediate device may be automatically rotated (e.g., with a motor coupled to the contact tip) and/or manually rotated (e.g., with a thumb wheel or other device configured to cause rotation in the contact tip) while limiting rotation of the second contact tip 314, which causes the threads of the second contact tip 314 to carry the second contact tip 314 toward or away from the first contact tip 306.

Additionally or alternatively, the first and/or second contact tips 306, 314 may be configured to be reversible to change the preheat length. For example, if the first contact tip 306 has a contact location with the electrode wire 114 that is closer than a midpoint of the first contact tip 306 to the second contact tip 314, reversing the first contact tip 306 changes the contact location with the electrode wire 114 and extends the preheat length. In some examples, different contact tips have different contact points, so that changing contact tips changes the preheat length. In some other examples, the welding assembly 202 may be replaced with a different welding assembly that has a different preheat length such as different spacing between the contact tips 306, 314 (which may require a different robotic program to be run that accounts for a different nozzle length).

The change in preheat length may be automatically controlled based on, for example, a temperature of the electrode wire 114 and/or based on a desired preheat level or heat input to the weld specified by a user. In some examples, a current controlled control loop is used to control preheat current when the preheat length is automatically adjustable.

The power and liquid transfer assembly 216 is attached to the torch body 338 on a side of the torch body 338 opposite the mounting assembly 204, or opposite a direction of the bend in the torch neck 1002. Because the power and liquid transfer assembly 216 increasing a volume of the torch 200, locating the power and liquid transfer assembly 216 opposite the mounting assembly 204 and/or opposite a direction of the bend in the torch neck 1002 may reduce the chances of collision with a workpiece when using the same program with the replacement preheating weld torch 200 as used with a conventional weld torch.

In still other examples, the welding assembly 202 may be provided with a wire oscillator to cause physical oscillation or weave at a tip of the electrode wire 114. An example implementation of the wire oscillator that may be used to provide wire oscillation is described in U.S. Pat. No. 4,295,031. Using both the wire oscillator and the contact tips 306, 314, disclosed example welding torches may provide both wire oscillation and resistive preheating to a weld to further improve deposition rates and weld quality.

Figure 16:
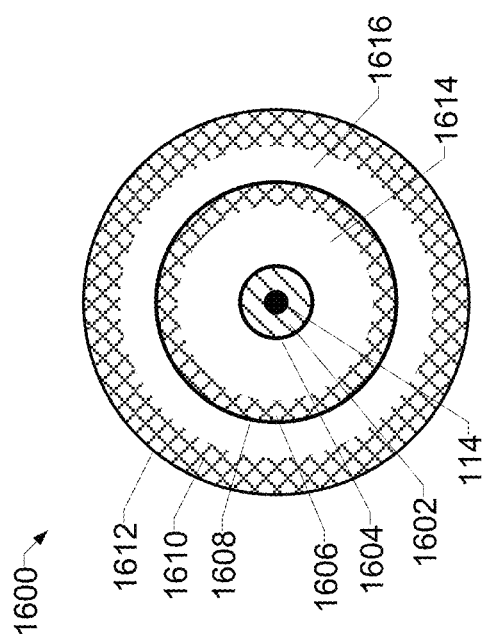
FIG. 16 is a cross section of an example welding cable that may be used to provide cooling liquid, welding current, and preheating current to a welding torch, and to carry cooling liquid away from the welding torch, in accordance with aspects of this disclosure.

FIG. 16 is a cross section of an example welding cable 1600 that may be used to provide cooling liquid, welding current, and preheating current to a welding torch, and to carry cooling liquid away from the welding torch. The example welding cable 1600 may be used instead of the liquid cooling assemblies 208, 210, in cases in which the first contact tip 306 is part of the preheating circuit and the welding circuit.

The welding cable 1600 is a coaxial-type welding cable, in which the electrode wire 114 is fed through a wire guide 1602. The wire guide 1602 is surrounded by a jacket 1604. A first conductor 1606 provides a first electrical path for preheating current, or welding current and preheating current. The first conductor 1606 may be, for example, a copper sheath or webbing rated to conduct welding current. The first conductor 1606 is surrounded by a jacket 1608.

A second conductor 1610 provides a second electrical path for preheat current, or welding current and preheating current. In the example of FIG. 16, a first one of the first conductor 1606 or the second conductor 1610 provides a path for the preheating current and is coupled to a preheating power supply. The second conductor 1610 is surrounded by a jacket 1612. In some examples, another protective layer may be present outside of the jacket 1612 to protect the welding cable 1600 from damage. In some examples, the jacket 1612 provides both physical and electrical protection to the cable 1600.

An annulus 1614 between the jacket 1604 and the first conductor 1606 and/or the jacket 1608 conducts cooling liquid in a first direction (e.g., from a liquid cooler to the welding torch, from the welding torch to the liquid cooler). An annulus 1616 between the jacket 1608 and the second conductor 1610 and/or the jacket 1612 conducts the cooling liquid in a second direction opposite the liquid flow direction in the annulus 1614.

Figure 17:
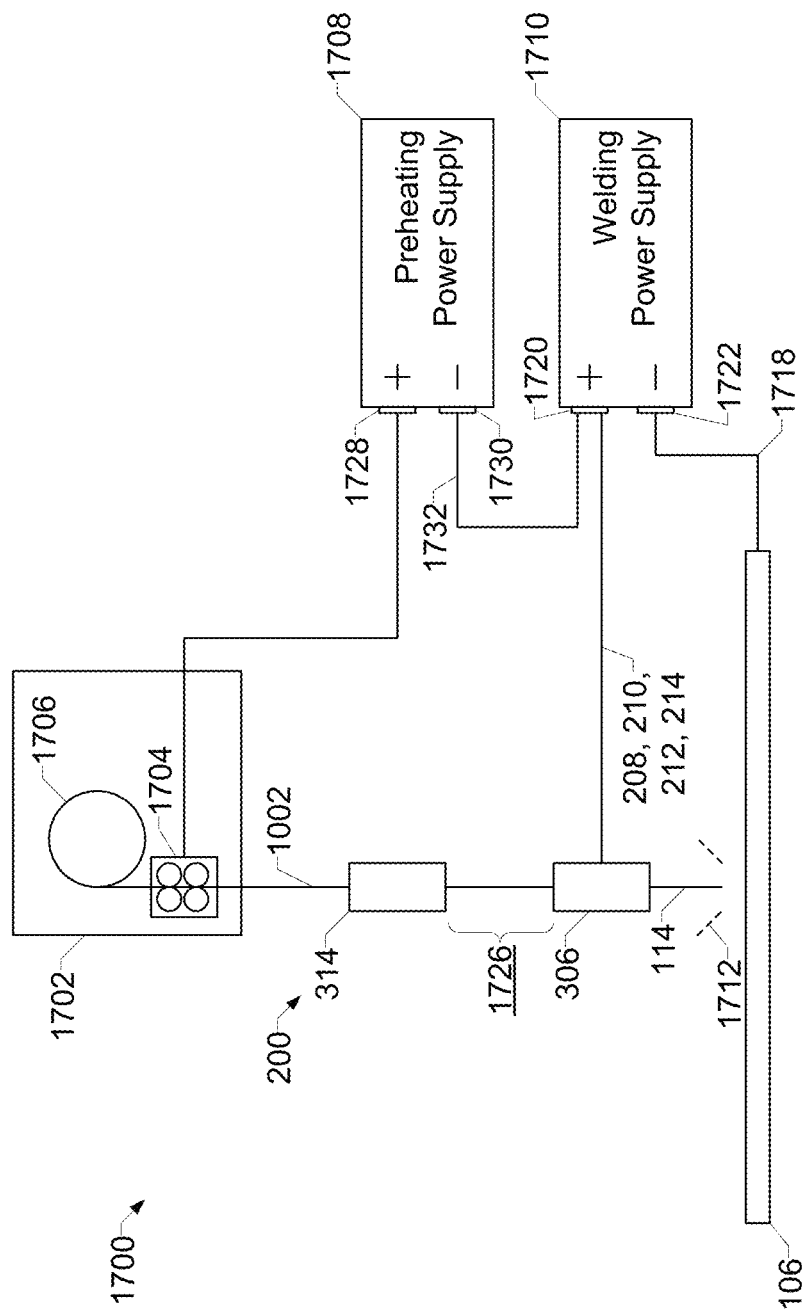
FIG. 17 illustrates a functional diagram of an example welding system including the example welding torch of FIG. 2, and which may be used with the welding system of FIG. 1.

FIG. 17 illustrates a functional diagram of an example welding system 1700 including the example welding torch 200 of FIG. 2, and which may be used with the welding system 100 of FIG. 1. The welding system 1700 includes the weld torch 200 having the first contact tip 306 and a second contact tip 314. The system 1700 further includes the electrode wire 114 fed from a wire feeder 1702 having a wire drive 1704 and a wire spool 1706, a preheating power supply 1708, and a welding power supply 1710. The system 1700 is illustrated in operation as producing a welding arc 1712 between the electrode wire 114 and a workpiece 106.

In operation, the electrode wire 114 passes from the wire spool 1706 through the second contact tip 314 and the first contact tip 306, between which the preheating power supply 1708 generates a preheating current to heat the electrode wire 114. Specifically, in the configuration shown in FIG. 17, the preheating current enters the electrode wire 114 via the second contact tip 314 (e.g., via the wire drive 1704 and/or the torch neck 1002 of FIG. 10) and exits via the first contact tip 306. At the first contact tip 306, a welding current may also enter the electrode wire 114 (e.g., via the liquid cooling assemblies 208 and 212, and/or 210 and 214. The welding current is generated, or otherwise provided by, the welding power supply 1710. The welding current exits the electrode wire 114 via the workpiece 106, which in turn generates the welding arc 1712. When the electrode wire 114 makes contact with a target metal workpiece 106, an electrical circuit is completed and the welding current flows through the electrode wire 114, across the metal work piece(s) 106, and returns to the welding power supply 1710. The welding current causes the electrode wire 114 and the parent metal of the work piece(s) 106 in contact with the electrode wire 114 to melt, thereby joining the work pieces as the melt solidifies. By preheating the electrode wire 114, a welding arc 1712 may be generated with drastically reduced arc energy. Generally speaking, the preheating current is proportional to the distance between the contact tips 306, 314 and the electrode wire 114 size.

The welding current is generated, or otherwise provided by, a welding power supply 1710, while the preheating current is generated, or otherwise provided by, the preheating power supply 1708. The preheating power supply 1708 and the welding power supply 1710 may ultimately share a common power source (e.g., a common generator or line current connection), but the current from the common power source is converted, inverted, and/or regulated to yield the two separate currents—the preheating current and the welding current. For instance, the preheat operation may be facilitated with a single power source and associated converter circuitry, in which case three leads may extend from a single power source.

During operation, the system 1700 establishes a welding circuit to conduct welding current from the welding power supply 1710 to the first contact tip 306 via the liquid cooling assemblies 208 and 212 and/or 210 and 214, and returns to the power supply 1710 via the welding arc 1712, the workpiece 106, and a work lead 1718. To enable connection between the welding power supply 1710 and the first contact tip 306 and the workpiece 106, the welding power supply 1710 includes terminals 1720, 1722 (e.g., a positive terminal and a negative terminal).

During operation, the preheating power supply establishes a preheating circuit to conduct preheating current through a section 1726 of the electrode wire 114. To enable connection between the preheating power supply 1708 and the contact tips 306, 314, the preheating power supply 1708 includes terminals 1728, 1730. The preheating current flows from the welding power supply 1710 to the second contact tip 314 (e.g., via the torch neck 1002), the section 1726 of the electrode wire 114, the first contact tip 306, and returns to the preheating power supply 1708 via a cable 1732 connecting the terminal 1720 of the welding power supply 1710 to the terminal 1730 of the preheating power supply 1708.

Because the preheating current path is superimposed with the welding current path over the connection between the first contact tip 306 and the power supplies 1708, 1710, the cable 1732 may enable a more cost-effective single connection between the first contact tip 306 and the power supplies 1708, 1710 (e.g., a single cable) than providing separate connections for the welding current to the first contact tip 306 and for the preheating current to the first contact tip 306. In other examples, the terminal 1730 of the preheating power supply 1708 is connected to the first contact tip 306 via a separate path than the path between the first contact tip 306 and the welding power supply 1710. For example, the welding current may be conducted via the liquid cooling assemblies 208 and 212 while the preheating current is conducted via the liquid cooling assemblies 210 and 214 (or vice versa).

In some examples, the welding torch may include a push-pull wire feed system by including a feed motor located at or near the weld torch to pull the electrode wire 114. In some examples, the inclusion of the pulling feed motor enables the portion of the electrode wire 114 that is preheated to a different location along the wire feed path than in the examples of FIGS. 2, 3, and 10. For example, the second contact tip 314 may be moved into the neck 1002 (e.g., prior to the bend in the torch neck 1002 in the feed direction of the electrode wire 114) and/or in the torch body (e.g., the mounting assembly 204 of FIG. 2) and/or multiple contact tips may be positioned at locations along the length of the electrode wire 114 to provide a preheating circuit that is separate from the welding circuit (e.g., does not share a same contact tip with the welding circuit) and/or provides an additional preheating circuit (e.g., a first preheating current applied to a first portion of the electrode wire 114 and a second preheat current applied to a second portion of the preheating wire). In some examples, the idler roller of a push-pull wire feed system may function as a contact tip to conduct preheating current. By moving all or a portion of the preheating circuit to the wire source side of the bend in the torch neck 1002 (e.g., the side of the bend closer to the wire spool in the electrode feed path), the size of the welding assembly may be reduced, the preheat length may be increased, and/or the preheating current may be reduced. Reduction in the size of the welding assembly and reduction in the preheating current enables torch dimensions that are closer to those of conventional, non-resistive preheating torches, further improving the ease of replacement of conventional torches with torches providing resistive preheating.

Figure 18:
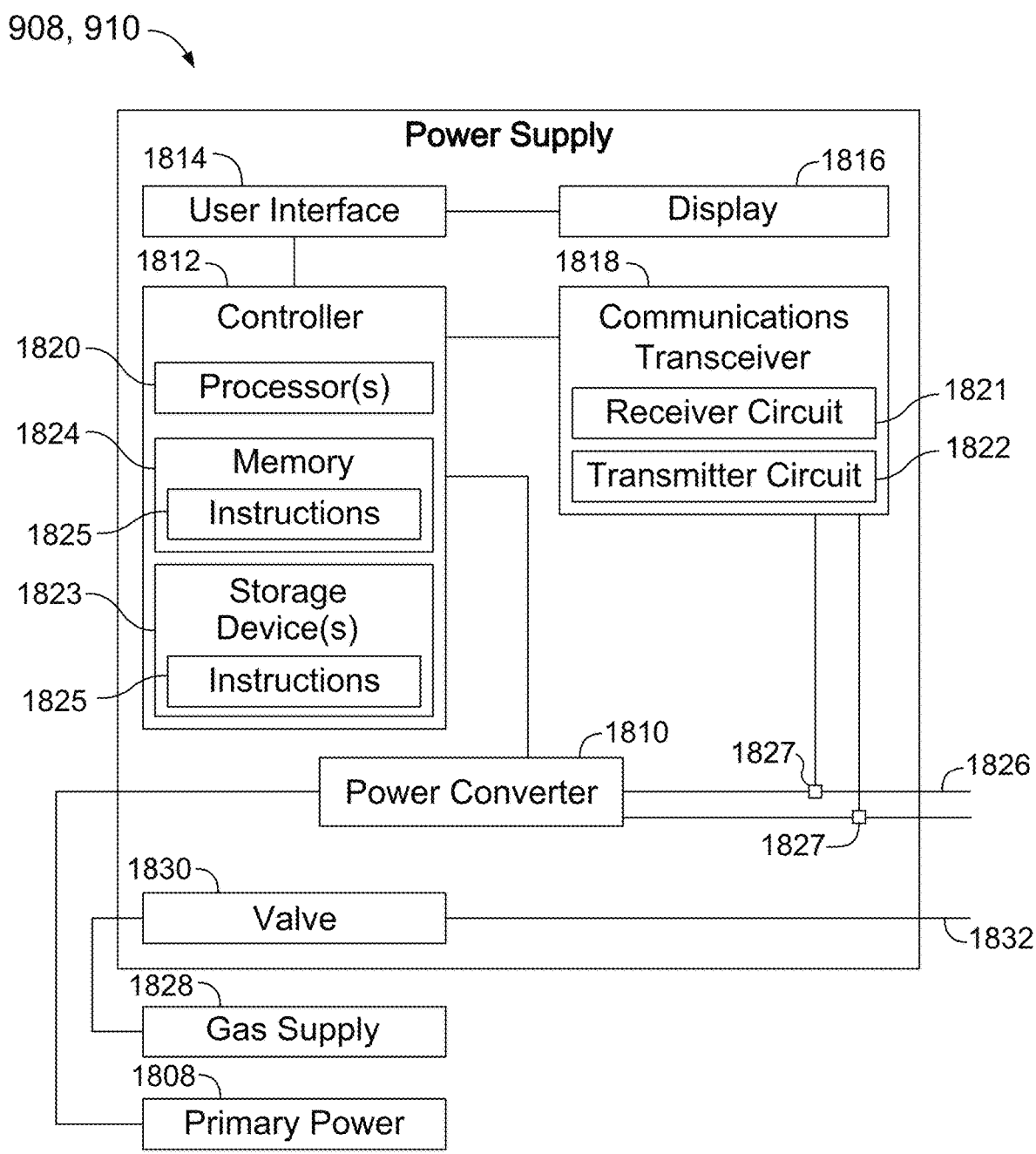
FIG. 18 is a block diagram of an example implementation of the power supplies of FIG. 17.

FIG. 18 is a block diagram of an example implementation of the power supplies 1708, 1710 of FIG. 17. The example power supply 1708, 1710 powers, controls, and supplies consumables to a welding application. In some examples, the power supply 1708, 1710 directly supplies input power to the welding tool 108. In the illustrated example, the power supply 1708, 1710 is configured to supply power to welding operations and/or preheating operations. The example power supply 1708, 1710 also provides power to a wire feeder to supply the electrode wire 114 to the welding tool 108 for various welding applications (e.g., GMAW welding, flux core arc welding (FCAW)).

The power supply 1708, 1710 receives primary power 1808 (e.g., from the AC power grid, an engine/generator set, a battery, or other energy generating or storage devices, or a combination thereof), conditions the primary power, and provides an output power to one or more welding devices and/or preheating devices in accordance with demands of the system. The primary power 1808 may be supplied from an offsite location (e.g., the primary power may originate from the power grid). The power supply 1708, 1710 includes a power converter 1810, which may include transformers, rectifiers, switches, and so forth, capable of converting the AC input power to AC and/or DC output power as dictated by the demands of the system (e.g., particular welding processes and regimes). The power converter 1810 converts input power (e.g., the primary power 1808) to welding-type power based on a weld voltage setpoint and outputs the welding-type power via a weld circuit.

In some examples, the power converter 1810 is configured to convert the primary power 1808 to both welding-type power and auxiliary power outputs. However, in other examples, the power converter 1810 is adapted to convert primary power only to a weld power output, and a separate auxiliary converter is provided to convert primary power to auxiliary power. In some other examples, the power supply 1708, 1710 receives a converted auxiliary power output directly from a wall outlet. Any suitable power conversion system or mechanism may be employed by the power supply 1708, 1710 to generate and supply both weld and auxiliary power.

The power supply 1708, 1710 includes a controller 1812 to control the operation of the power supply 1708, 1710. The power supply 1708, 1710 also includes a user interface 1814. The controller 1812 receives input from the user interface 1814, through which a user may choose a process and/or input desired parameters (e.g., voltages, currents, particular pulsed or non-pulsed welding regimes, and so forth). The user interface 1814 may receive inputs using any input device, such as via a keypad, keyboard, buttons, touch screen, voice activation system, wireless device, etc. Furthermore, the controller 1812 controls operating parameters based on input by the user as well as based on other current operating parameters. Specifically, the user interface 1814 may include a display 1816 for presenting, showing, or indicating, information to an operator. The controller 1812 may also include interface circuitry for communicating data to other devices in the system, such as the wire feeder. For example, in some situations, the power supply 1708, 1710 wirelessly communicates with other welding devices within the welding system. Further, in some situations, the power supply 1708, 1710 communicates with other welding devices using a wired connection, such as by using a network interface controller (NIC) to communicate data via a network (e.g., ETHERNET, 10 baseT, 10 base100, etc.). In the example of FIG. 18, the controller 1812 communicates with the wire feeder via the weld circuit via a communications transceiver 1818.

The controller 1812 includes at least one controller or processor 1820 that controls the operations of the welding power supply 1802. The controller 1812 receives and processes multiple inputs associated with the performance and demands of the system. The processor 1820 may include one or more microprocessors, such as one or more "general-purpose" microprocessors, one or more special-purpose microprocessors and/or ASICS, and/or any other type of processing device. For example, the processor 1820 may include one or more digital signal processors (DSPs).

The example controller 1812 includes one or more storage device(s) 1823 and one or more memory device(s) 1824. The storage device(s) 1823 (e.g., nonvolatile storage) may include ROM, flash memory, a hard drive, and/or any other suitable optical, magnetic, and/or solid-state storage medium, and/or a combination thereof. The storage device 1823 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth.

The memory device 1824 may include a volatile memory, such as random access memory (RAM), and/or a nonvolatile memory, such as read-only memory (ROM). The memory device 1824 and/or the storage device(s) 1823 may store a variety of information and may be used for various purposes. For example, the memory device 1824 and/or the storage device(s) 1823 may store processor executable instructions 1825 (e.g., firmware or software) for the processor 1820 to execute. In addition, one or more control regimes for various welding processes, along with associated settings and parameters, may be stored in the storage device 1823 and/or memory device 1824, along with code configured to provide a specific output (e.g., initiate wire feed, enable gas flow, capture welding current data, detect short circuit parameters, determine amount of spatter) during operation.

In some examples, the welding power flows from the power converter 1810 through a weld cable 1826. The example weld cable 1826 is attachable and detachable from weld studs at each of the power supply 1708, 1710 (e.g., to enable ease of replacement of the weld cable 1826 in case of wear or damage). Furthermore, in some examples, welding data is provided with the weld cable 1826 such that welding power and weld data are provided and transmitted together over the weld cable 1826. The communications transceiver 1818 is communicatively coupled to the weld cable 1826 to communicate (e.g., send/receive) data over the weld cable 1826. The communications transceiver 1818 may be implemented based on various types of power line communications methods and techniques. For example, the communications transceiver 1818 may utilize IEEE standard P1901.2 to provide data communications over the weld cable 1826. In this manner, the weld cable 1826 may be utilized to provide welding power from the power supply 1708, 1710 to the wire feeder and the welding tool 108. Additionally or alternatively, the weld cable 1826 may be used to transmit and/or receive data communications to/from the wire feeder and the welding tool 108. The communications transceiver 1818 is communicatively coupled to the weld cable 1826, for example, via cable data couplers 1827, to characterize the weld cable 1826, as described in more detail below. The cable data coupler 1827 may be, for example, a voltage or current sensor.

In some examples, the power supply 1708, 1710 includes or is implemented in a wire feeder.

The example communications transceiver 1818 includes a receiver circuit 1821 and a transmitter circuit 1822. Generally, the receiver circuit 1821 receives data transmitted by the wire feeder via the weld cable 1826 and the transmitter circuit 1822 transmits data to the wire feeder via the weld cable 1826. As described in more detail below, the communications transceiver 1818 enables remote configuration of the power supply 1708, 1710 from the location of the wire feeder and/or compensation of weld voltages by the power supply 1708, 1710 using weld voltage feedback information transmitted by the wire feeder 104. In some examples, the receiver circuit 1821 receives communication(s) via the weld circuit while weld current is flowing through the weld circuit (e.g., during a welding-type operation) and/or after the weld current has stopped flowing through the weld circuit (e.g., after a welding-type operation). Examples of such communications include weld voltage feedback information measured at a device that is remote from the power supply 1708, 1710 (e.g., the wire feeder) while the weld current is flowing through the weld circuit Example implementations of the communications transceiver 1818 are described in U.S. Pat. No. 9,012,807. The entirety of U.S. Pat. No. 9,012,807 is incorporated herein by reference. However, other implementations of the communications transceiver 1818 may be used.

The example wire feeder 104 also includes a communications transceiver 1819, which may be similar or identical in construction and/or function as the communications transceiver 1818.

In some examples, a gas supply 1828 provides shielding gases, such as argon, helium, carbon dioxide, and so forth, depending upon the welding application. The shielding gas flows to a valve 1830, which controls the flow of gas, and if desired, may be selected to allow for modulating or regulating the amount of gas supplied to a welding application. The valve 1830 may be opened, closed, or otherwise operated by the controller 1812 to enable, inhibit, or control gas flow (e.g., shielding gas) through the valve 1830. Shielding gas exits the valve 1830 and flows through a cable 1832 (which in some implementations may be packaged with the welding power output) to the wire feeder which provides the shielding gas to the welding application. In some examples, the power supply 1708, 1710 does not include the gas supply 1828, the valve 1830, and/or the cable 1832.

Figure 19:
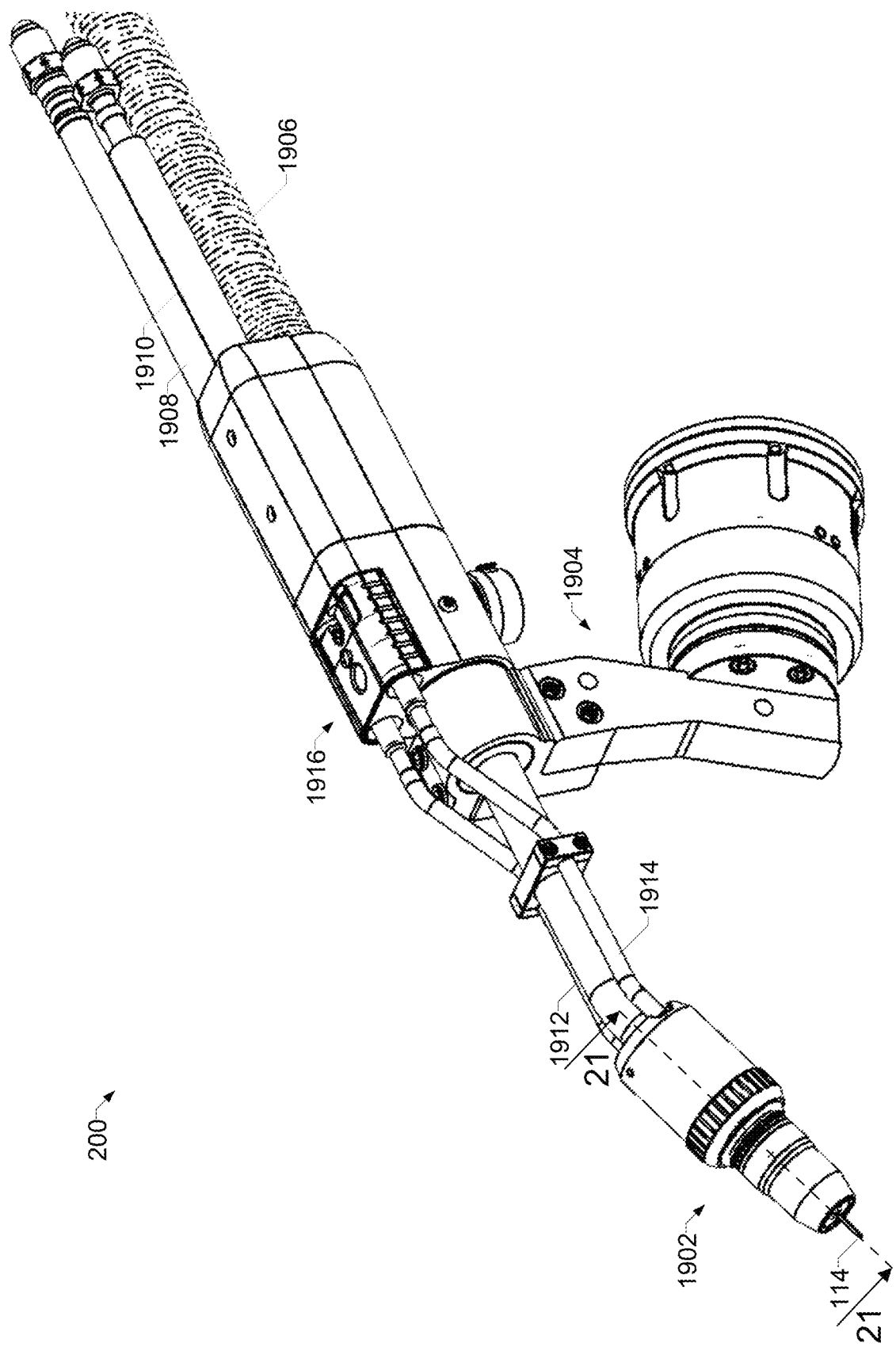
FIG. 19 illustrates another example liquid-cooled welding torch, in accordance with aspects of this disclosure.

FIG. 19 illustrates another example liquid-cooled welding torch 1900. Like the torch 200 of FIGS. 2-14B, the example liquid-cooled welding torch 1900 resistively preheats an electrode wire 114 via multiple contact points (e.g., contact tips) in the torch 1900.

The torch 1900 of FIG. 19 includes a welding assembly 1902, a mounting assembly 1904, a weld cable 1906, liquid cooling assemblies 1908, 1910, 1912, 1914, and a power and liquid transfer assembly 1916. The example liquid-cooled welding torch 1900 may be used to replace conventional robotic welding torches with resistive preheating-enabled welding torches having a same tool center point (TCP).

The welding assembly 1902 receives weld current and preheating current, conducts the weld current to the electrode wire 114, and conducts the preheating current through a portion of the electrode wire 114. The example welding assembly 1902 is liquid-cooled by liquid provided via the liquid cooling assemblies 1908-214. The example welding assembly 1902 of FIG. 19 receives the weld current via one or more of the weld cable 1906, the liquid cooling assemblies 1908 and 1912, and/or the liquid cooling assemblies 1910 and 1914. Because the workpiece provides the return path for the weld current to the power supply, no return path is provided via the weld cable 1906 or the liquid cooling assemblies 1908. The weld cable 1906 is a air-cooled (or gas-cooled) cable. However, the weld cable 1906 may also be liquid-cooled.

The example welding assembly 1902 receives the preheating current via the weld cable 1906, the liquid cooling assemblies 1908 and 1912, and/or the liquid cooling assemblies 1910 and 1914. In the example of FIG. 19, the weld current is conducted via a different one of the weld cable 1906, the liquid cooling assemblies 1908 and 1912, or the liquid cooling assemblies 1910 and 1914 than the preheating current that has the same polarity (i.e., current flow direction). The welding assembly 1902 conducts the preheating current through a section of the electrode wire 114 to heat the electrode wire via resistive heating (e.g., $I^2R$ heating). The preheat current then returns to a preheating power supply via a different one of weld cable 1906, the liquid cooling assemblies 1908 and 1912, or the liquid cooling assemblies 1910 and 1914 to complete a preheating circuit.

In the example of FIG. 19, the weld current path, the preheating current supply path, and the preheating current return path may all be different ones of the weld cable 1906, the liquid cooling assemblies 1908 and 1912, and the liquid cooling assemblies 1910 and 1914. In some examples, the weld current path may be superimposed with the preheating current supply path or the preheating current return path to reduce the net current in the conductor. For example, if the weld current is 300 A and the preheating current is 100 A, the weld current and the preheating current may be superimposed to result in a net current of 1900 A.

As described in more detail below, the welding assembly 1902 and the liquid cooling assemblies 1912, 1914 may be separated from the remainder of the liquid-cooled welding torch 1900 via the power and liquid transfer assembly 1916, and may be simultaneously separated from the mounting assembly 1904.

Figure 20:
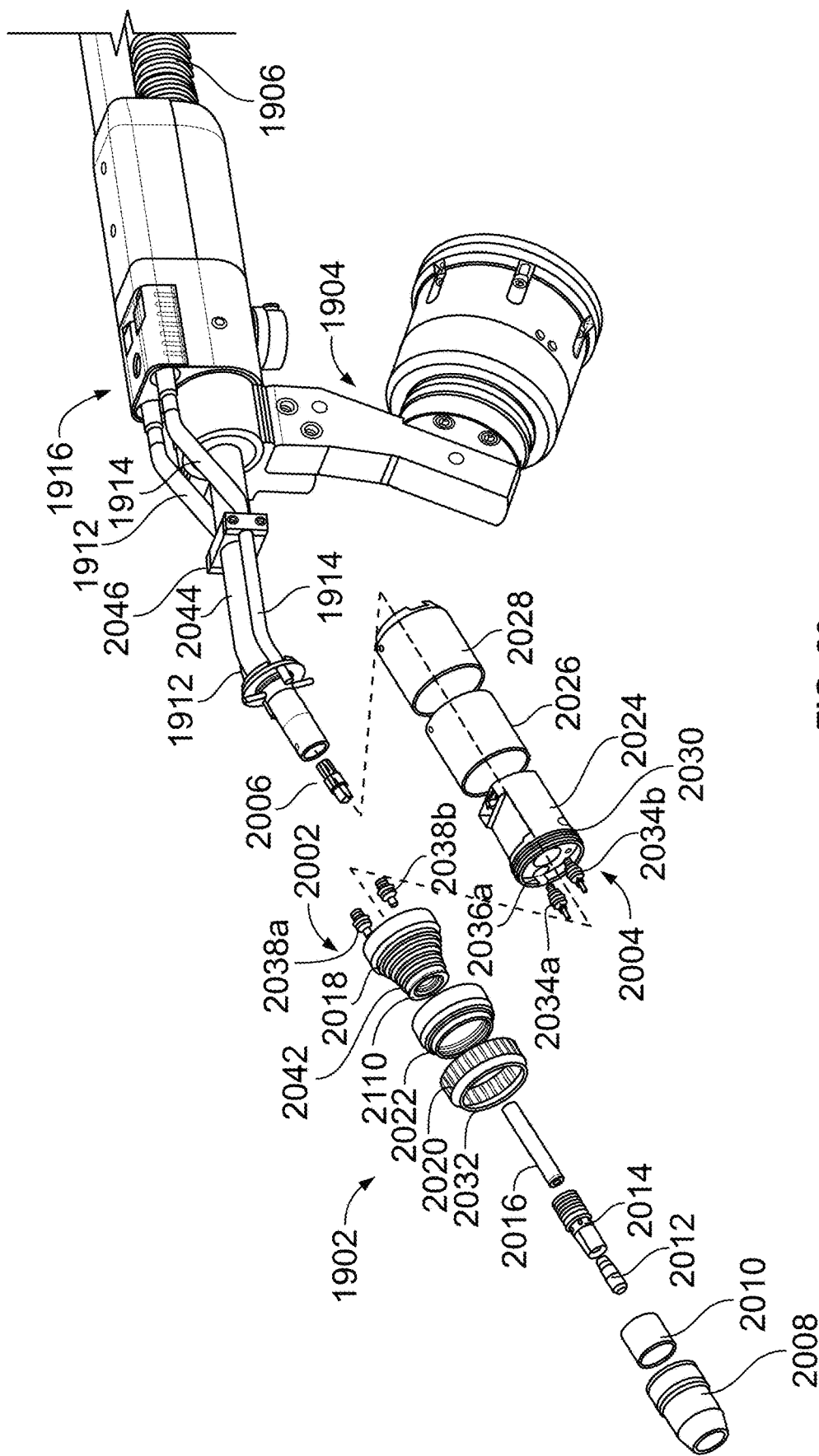
FIG. 20 is an exploded view of the example welding torch of FIG. 19.
Figure 21:
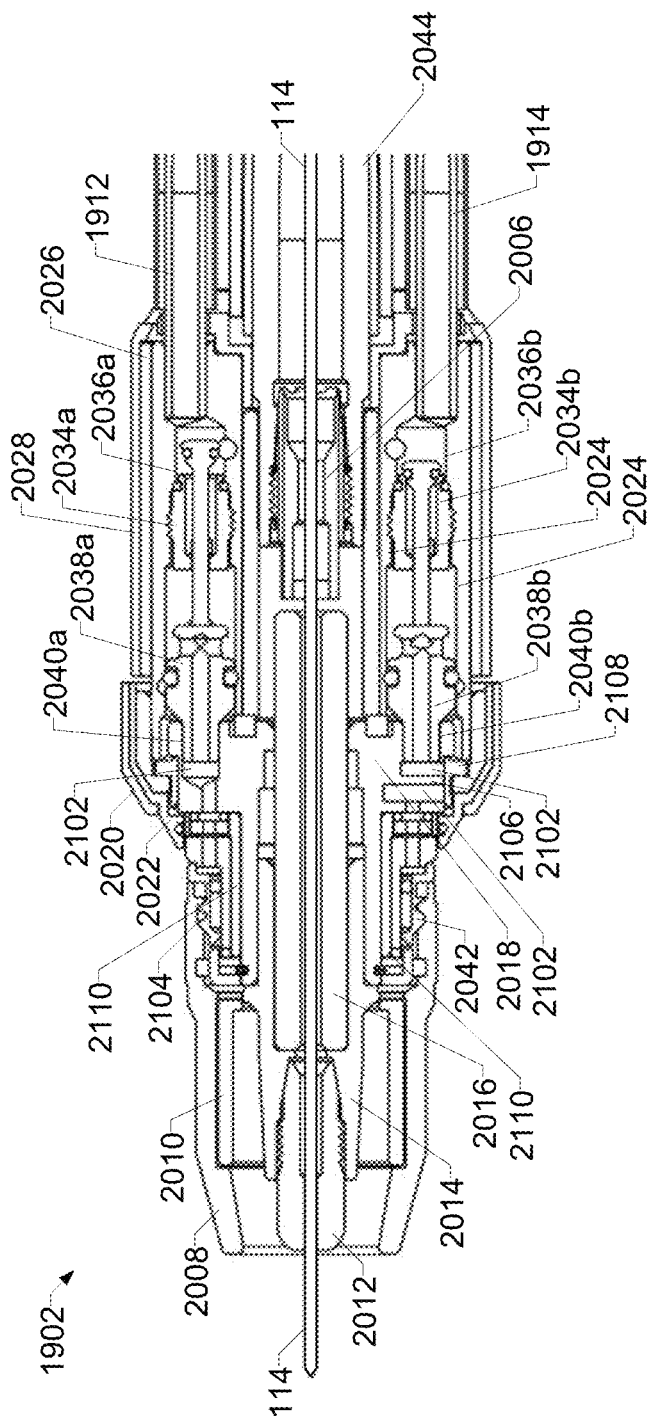
FIG. 21 is a cross-sectional plan view of the example welding assembly of FIG. 19.

FIG. 20 is an exploded view of the example welding assembly 1902 of the welding torch 1900 of FIG. 19. The welding assembly 1902 includes a front portion 2002 and a rear portion 2004. FIG. 21 is a cross-sectional plan view of the example welding assembly 1902 of FIG. 19 in which the front portion 2002 is coupled to the rear portion 2004. As described in more detail below, the front portion 2002 is detachable from the rear portion to enable access to a rear contact tip 2006 (e.g., a preheating contact tip).

The front portion 2002 includes a nozzle 2008, a nozzle insulator 2010, a front contact tip 2012, a diffuser 2014, a wire guide 2016, a cooling body 2018, a hand nut 2020, and a hand nut insulator 2022. The rear portion 2004 includes a valve assembly 2024, a valve assembly insulator 2026, and a valve assembly housing 2028.

The example hand nut 2020 secures the cooling body 2018, and the components 2008-2016 connected to the cooling body 2018, to the rear portion 2004. In the example of FIG. 20, the hand nut 2020 has internal screw threads to be threaded onto external screw threads 2030 of the valve assembly 2024. A tapered edge 2032 of the hand nut 2020 mates with a shoulder of the cooling body 2018 to force the cooling body 2018 toward the valve assembly 2024. The hand nut insulator 2022 electrically insulates the hand nut to reduce or prevent an operator contacting weld voltage and/or preheating voltage via the hand nut 2020.

The example valve assembly 2024 includes fluid valves 2034a, 2034b positioned within fluid channels 2036a, 2036b, respectively. The fluid channels 2036a, 2036b are in fluid communication with the liquid cooling assemblies 1912, 1914 to circulate fluid through the welding assembly 1902. The example valves 2034a, 2034b are Shrader valves that cut off fluid flow when the valves are not actuated. To actuate the valves, the example cooling body 2018 includes valve actuators 2038a, 2038b, which are located within channels 2040a, 2040b of the cooling body 2018. The valve actuators 2038a, 2038b actuate the valves 2034a, 2034b when the front portion 2002 (including the cooling body 2018) is secured to the rear portion 2004.

When the valves are actuated, the cooling body 2018 is in fluid communication with the liquid cooling assemblies 1912, 1914. The example cooling body 2018 includes one or more internal channels to direct fluid from one of the valve actuators 2038a, 2038b to a second one of the valve actuators 2038a, 2038b. In other words, one of the valve actuators 2038a, 2038b is an inlet to the channel(s) 2102 in the cooling body 2018 from one of the liquid cooling assemblies 1912, 1914 and the other of the valve actuators 2038a, 2038b is an outlet from the channel(s) 2102 to the other of the liquid cooling assemblies 1912, 1914. The example channels 2102 run circumferentially within the cooling body 2018 between the valve actuators 2038a, 2038b to transfer heat from the nozzle 2008 to the fluid within the channels 2102.

The example nozzle 2008 includes internal threads 2104 that couple the nozzle 2008 to a threaded ring 2042 coupled to an exterior of the cooling body 2018. When coupled, heat from the nozzle 2008 is transferred to the cooling body 2018 for further dissipation to the cooling liquid.

When secured (e.g., threaded together), the cooling body 2018 and the valve assembly 2024 are in electrical contact to transfer welding current and/or preheating current with the front contact tip 2012 via the diffuser 2014. The welding current and/or preheating current are conducted via one or more of the liquid cooling assemblies 1912, 1914. For example, one or both of the liquid cooling assemblies 1912, 1914 include a conductor layer electrically coupled to the front contact tip 2012 via the diffuser 2014, the cooling body 2018, and the valve assembly 2024. Preheating current is conducted to the rear contact tip 2006 from the weld cable 1906 via a torch neck 2044, which includes one or more layers of conductors, a wire liner to transfer the electrode wire 114, and an annulus to provide gas flow to the weld assembly 1902 for output to the weld via the diffuser 2014.

As illustrated in FIG. 20, the liquid cooling assemblies 1912, 1914 may be secured to the torch neck 2044 via bracket 2046 or other attachment technique.

The example wire guide 2016 may be similar or identical to the wire guide 308 of FIG. 3. The wire guide 2016 is held within a bore in the diffuser 2014. The nozzle insulator 2010 electrically and thermally insulates the nozzle 2008 from the front contact tip 2012 and the diffuser 2014. The nozzle 2008 is electrically insulated from the cooling body 2018 by one or more additional electrical insulator(s) 2110 located on the cooling body 2018. The example electrical insulator(s) 2110 may be thermally conductive to conduct heat from the nozzle 2008 to the cooling body 2018. Polyether ether ketone (PEEK) and/or other thermoplastics may be used to implement the example electrical insulator(s) 2110.

The example cooling body 2018 may include any number of electrical insulators and/or fluid seals to enable conduction of current to the diffuser 2014, reduce or prevent conduction of current to unneeded or undesired components (e.g., exterior components), and/or to reduce or prevent fluid leaks from the cooling body 2018. In the example of FIG. 21, the cooling body 2018 includes an inner body 2106 defining the channel(s) 2102 and a cover 2108 configured to enclose the channels 2102.

The example rear contact tip 2006 may be similar or identical to the second contact tip 314 of FIGS. 3 and 13A-13C.

Figure 22:
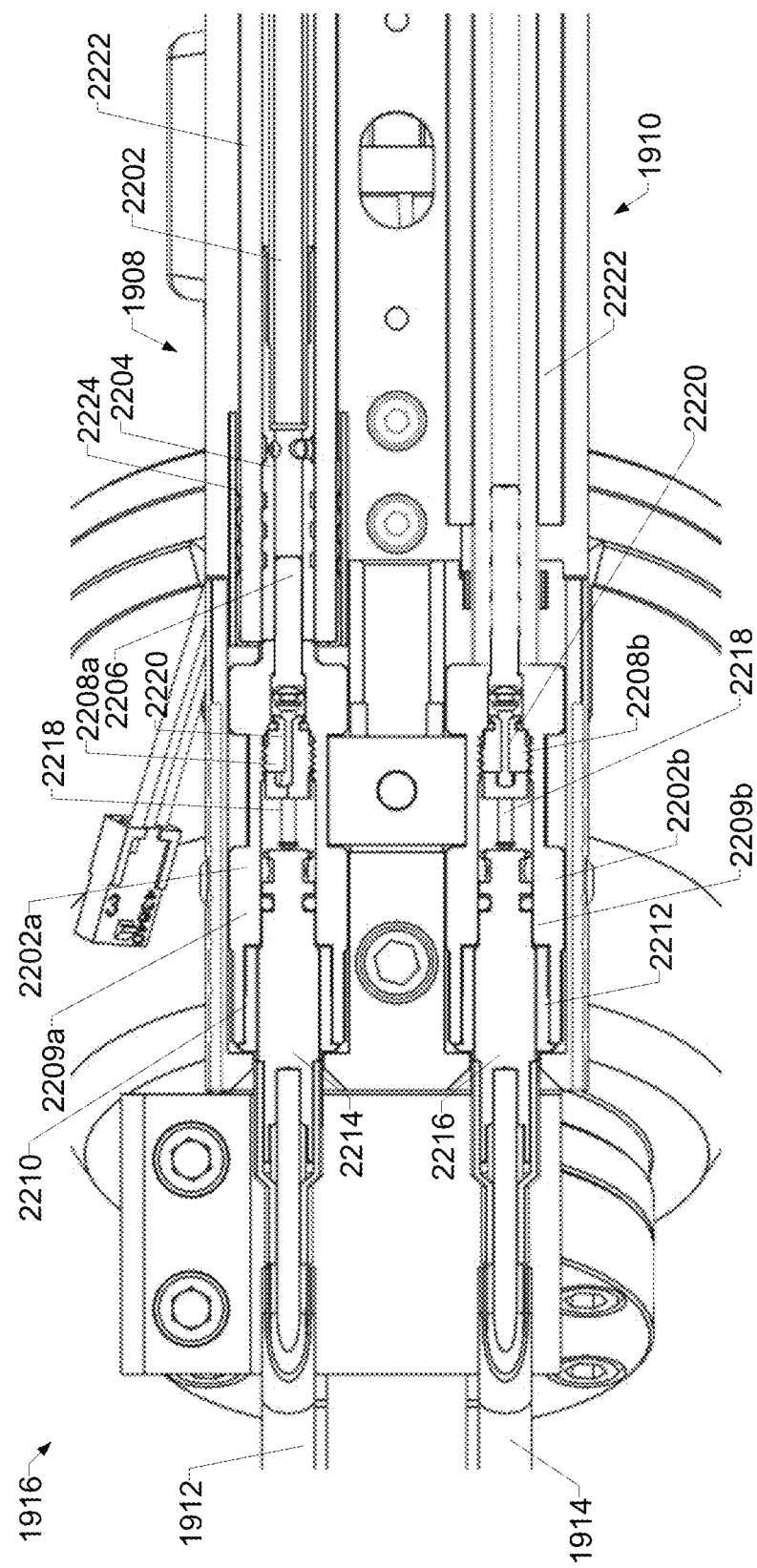
FIG. 22 is a cross-sectional plan view of the example power and liquid transfer assembly of FIG. 19.
Figure 23:
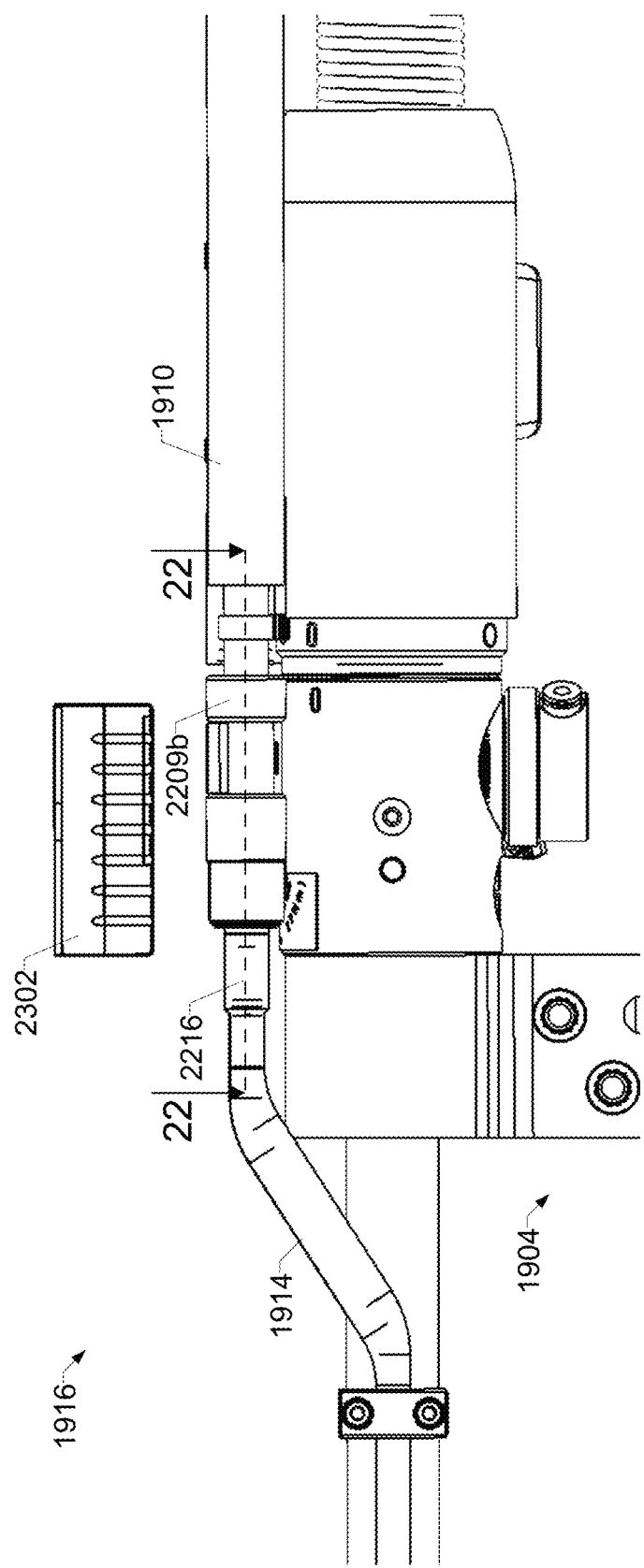
FIG. 23 is a view of the example power and liquid transfer assembly of FIG. 19.

FIG. 22 is a cross-sectional plan view of the example power and liquid transfer assembly 1916 of FIG. 19. FIG. 23 is a partially exploded elevation view of the example power and liquid transfer assembly 1916 of FIG. 19.

The example power and liquid transfer assembly 1916 is similar to the power and liquid transfer assembly 216 of FIGS. 2, 3, and 8, in that the power and liquid transfer assembly 1916 includes multiple liquid transfer valves, corresponding valve actuators, and one or more electrical power transfer sockets, and in that the power and liquid transfer assembly 1916 enables disconnection of the liquid cooling assemblies 1912, 1914 from the power and liquid transfer assembly 1916 and cuts off fluid transfer in response to disconnection.

The example power and liquid transfer assembly 1916 is coupled to the liquid cooling assemblies 1908, 1910, which provide supply and return lines for the cooling liquid to a liquid cooler. The example liquid cooling assembly 1908 includes an internal conductor 2202 to conduct welding current (e.g., to the welding power supply 1710 of FIG. 17) and/or preheating current (e.g., to the preheating power supply 1708). The conductor 2202 is in electrical contact with a socket 2204, which permits fluid to flow from an exterior of the socket 2204 to an interior of the socket 2204, into which a fluid fitting 2206 of the power and liquid transfer assembly 1916 is fitted to make a fluid connection with the liquid cooling assembly 1908 and electrical contact with the socket 2204. In the example of FIG. 22, the liquid cooling assembly 1910 only includes tubing to transfer liquid, and does not include an internal conductor or a socket. In other examples, the liquid cooling assembly 1910 also includes a conductor and has a construction similar or identical to the liquid cooling assembly 1908.

Each of the example liquid cooling channels of the power and liquid transfer assembly 1916 includes a liquid shutoff valve 2208a, 2208b within a fluid socket 2209a, 2209b. The channel coupled to the liquid cooling assembly 1908 (e.g., carrying current and liquid) includes a power transfer socket 2210. The channel coupled to the liquid cooling assembly 1910 (e.g., carrying only liquid) may include a non-conductive socket 2212 having similar, the same, or different dimensions as the power transfer socket 2210.

The power cable socket 2210 receives a power connector pin 2214 of the liquid cooling assembly 1912 to transfer cooling liquid and welding current and/or preheating current to the liquid cooling assembly 1912. The nonconductive socket 2212 likewise receives a power connector pin or other pin corresponding to the dimensions of the socket 2212. The power transfer socket 2210 enables insertion of the power connector pin 2214, and transfers current to and/or from an inserted power connector pin 2214. An example power transfer socket that may be used to implement the power transfer socket 2210 is a PowerBud® power contact, sold by Methode Electronics, Inc., which provides multiple contact points between the power transfer socket and an inserted power connector pin 2214.

The liquid shutoff valves 2208a, 2208b selectively permit flow of liquid from liquid cooling assemblies 1908, 1910 to the sockets 2210, 2212 and to a connected liquid cooling assembly 1912, 1914. The example liquid shutoff valves 2208a, 2208b are Schrader valves. However, other types of valves may be used to implement the liquid shutoff valves 2208a, 2208b. When a power connector pin 2214, 2216 is inserted (e.g., fully inserted) into the sockets 2210, 2212, the power connector pin 2214, 2216 displaces (e.g., unseats) a stem 2218 from a core 2220 of the valve 2208a, 2208b, which permits liquid to flow to and/or from the hose liquid cooling assemblies 1908-1914. When the power connector pins 2214, 2216 are removed or partially removed, the stems 2218 are forced back into the cores 2220 and stop flow of liquid.

A hose 2222 of the liquid cooling assemblies 1908 is coupled to the fluid socket 2209a via a ferrule 2224. The example the example sockets 2209a, 2209b and/or the hoses 2222 include hose barbs to secure the hoses 2222. However, other methods of securing the hose to the sockets 2209a, 2209b may be used, such as clamps, compression fittings, or any other hose fittings.

The example power and liquid transfer assembly 1916 may operate as described above with reference to the power and liquid transfer assembly 216 of FIG. 8.

As illustrated in FIG. 23, the liquid cooling assembles 1912, 1914 may be secured to the power and liquid transfer assembly 1916 at least partly using a cover 2302 configured to prevent disconnection of the power connector pins 2214, 2216 from the power and liquid transfer assembly 1916. For example, the cover 2302 may include a shoulder and/or other features configured to prevent movement of the power connector pins 2214, 2216 away from the power and liquid transfer assembly 1916. The cover 2302 may be secured by a fastener, such as a bolt, and/or any other type of fastener or fastening technique.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

All documents cited herein, including journal articles or abstracts, published or corresponding U.S. or foreign patent applications, issued or foreign patents, or any other documents are each entirely incorporated by reference herein, including all data, tables, figures, and text presented in the cited documents.

What is claimed is:

1. A welding assembly for a welding torch, the welding assembly comprising: a first contact tip configured to conduct welding current to a consumable electrode; a second contact tip configured to conduct preheating current to the consumable electrode; an electrically conductive cooling body positioned between the first contact tip and the second contact tip and configured to transfer heat from at least the first contact tip to coolant and to conduct the welding current through the electrically conductive cooling body; and a contact tip insulator configured to insulate the second contact tip from the first contact tip, the contact tip insulator comprising an exterior surface configured to contact the cooling body to prevent electrical contact between the cooling body and the second contact tip.

2. The welding assembly as defined in claim 1, wherein the contact tip insulator comprises: an interior surface configured to be removably attached to a torch neck holding a contact tip; and a seal on the exterior surface to substantially seal gas flow in cooperation with the cooling body.

3. The welding assembly as defined in claim 2, wherein the contact tip insulator comprises at least one of a ceramic or a plastic.

4. The welding assembly as defined in claim 2, wherein the contact tip insulator is a thermal insulator.

5. The welding assembly as defined in claim 1, further comprising a wire guide, the wire guide comprising a dielectric material and having an inner bore configured to permit passage of the consumable electrode from the second contact tip to the first contact tip.

6. The welding assembly as defined in claim 5, wherein the dielectric material comprises at least one of a ceramic, a liquid ceramic, silicon nitride, or a dielectric exterior coating.

7. The welding assembly as defined in claim 1, further comprising a diffuser, the diffuser comprising:
 a first exterior portion configured to be coupled to the cooling body;
 a first interior portion configured to receive welding gas from an interior of the cooling body;
 a second interior portion configured to receive the first contact tip and to conduct current to the first contact tip; and
 a gas diffusion port configured to conduct welding gas from the first interior portion to a second exterior portion, the gas diffusion port configured to conduct the welding gas in a radial direction of the diffuser.

8. The welding assembly as defined in claim 7, further comprising an insulator configured to electrically insulate the diffuser from a nozzle.

9. The welding assembly as defined in claim 1, wherein the cooling body comprises:
 a liquid coolant inlet port;
 a liquid coolant outlet port; and
 a channel to channel the liquid coolant from the liquid coolant inlet port to the liquid coolant outlet port.

10. A welding assembly for a welding torch, the welding assembly comprising:
 a first contact tip configured to conduct welding current to a consumable electrode;
 a second contact tip configured to conduct preheating current to the consumable electrode;
 a cooling body configured to transfer heat from at least the first contact tip to coolant and to conduct the welding current, wherein the cooling body comprises:
  a liquid coolant inlet port comprising a valve actuator configured to actuate a valve by insertion into a first socket;
  a liquid coolant outlet port comprising a valve actuator configured to actuate a valve by insertion into a second socket; and
  a channel to channel the liquid coolant from the liquid coolant inlet port to the liquid coolant outlet port; and
 a contact tip insulator configured to insulate the second contact tip from the first contact tip, the contact tip insulator comprising an exterior surface configured to contact the cooling body to prevent electrical contact between the cooling body and the second contact tip, wherein the second contact tip, the cooling body, and the contact tip insulator are configured to enable removal of the second contact tip via the cooling body and the contact tip insulator without removal of the cooling body and the contact tip insulator.

11. The welding assembly as defined in claim 9, further comprising an exterior nut configured to secure a first portion of the welding assembly to a second portion of the welding assembly, the first portion of the welding assembly comprising the first contact tip.

12. The welding assembly as defined in claim 11, wherein the first portion of the welding assembly comprises at least one of the second contact tip or the cooling body.

13. The welding assembly as defined in claim 9, wherein the cooling body comprises a cover to enclose the channel.

14. The welding assembly as defined in claim 1, wherein the contact tip insulator is attached to exterior threads of a neck of the welding torch.

15. The welding assembly as defined in claim 14, wherein the second contact tip is attached to interior threads of the neck of the welding torch.

16. The welding assembly as defined in claim 9, wherein the cooling body defines the channel as a tortuous path within the cooling body from the liquid coolant inlet port to the liquid coolant outlet port.

17. The welding assembly as defined in claim 16, wherein the tortuous path is directed around a circumference of a bore of the cooling body from the liquid coolant inlet port to the liquid coolant outlet port.

18. The welding assembly as defined in claim 1, wherein the cooling body has a tapered outer diameter.

19. A welding assembly for a welding torch, the welding assembly comprising:
 a first contact tip configured to conduct welding current to a consumable electrode;
 a second contact tip configured to conduct preheating current to the consumable electrode;
 a cooling body configured to transfer heat from at least the first contact tip to coolant and to conduct the welding current, wherein the cooling body comprises:
  a liquid coolant inlet port comprising a valve actuator configured to actuate a valve by insertion into a first socket;
  a liquid coolant outlet port comprising a valve actuator configured to actuate a valve by insertion into a second socket; and
  a channel to channel the liquid coolant from the liquid coolant inlet port to the liquid coolant outlet port; and
 a contact tip insulator configured to insulate the second contact tip from the first contact tip, the contact tip insulator comprising an exterior surface configured to contact the cooling body to prevent electrical contact between the cooling body and the second contact tip.

* * * * *